United States Patent
Liu et al.

(10) Patent No.: US 12,193,100 B2
(45) Date of Patent: Jan. 7, 2025

(54) IMPLEMENTING DATA SCRAMBLING TRANSMISSION DURING USER COOPERATION TRANSMISSION

(71) Applicant: Huawei Technologies Co., Ltd., Shenzhen (CN)

(72) Inventors: Rongkuan Liu, Shanghai (CN); Peng Zhang, Shanghai (CN); Hua Xu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 17/660,323

(22) Filed: Apr. 22, 2022

(65) Prior Publication Data

US 2022/0248492 A1 Aug. 4, 2022

Related U.S. Application Data

(63) Continuation of application No. PCT/CN2020/123272, filed on Oct. 23, 2020.

(30) Foreign Application Priority Data

Oct. 24, 2019 (CN) .......... 201911019202.X

(51) Int. Cl.
*H04W 76/25* (2018.01)
*H04W 76/23* (2018.01)
*H04W 88/04* (2009.01)
*H04W 92/18* (2009.01)

(52) U.S. Cl.
CPC .......... *H04W 76/25* (2018.02); *H04W 76/23* (2018.02); *H04W 88/04* (2013.01); *H04W 92/18* (2013.01)

(58) Field of Classification Search
CPC ..... H04W 76/25; H04W 76/23; H04W 88/04; H04W 92/18; H04W 12/76; H04W 12/03; H04W 12/75; H04W 76/11
See application file for complete search history.

(56) References Cited

U.S. PATENT DOCUMENTS

2019/0158225 A1 5/2019 Wang et al.
2019/0239032 A1* 8/2019 Balasubramanian ....................... H04L 65/611
(Continued)

FOREIGN PATENT DOCUMENTS

| CN | 107548099 A | 1/2018 |
| CN | 108668367 A | 10/2018 |
| CN | 109217989 A | 1/2019 |

(Continued)

OTHER PUBLICATIONS

"Multi-Path Diversity for Uplink Transmission Through Sidelinks"; Fong, Lik Hang Silas; Nov. 5, 2019; Qualcomm (Year: 2019).*

(Continued)

*Primary Examiner* — Ian N Moore
*Assistant Examiner* — Latresa A McCallum
(74) *Attorney, Agent, or Firm* — Slater Matsil, LLP

(57) ABSTRACT

A first terminal device obtains first data from a network device based on a first identifier, where the first identifier is used to identify a first cooperation group, and the first cooperation group includes the first terminal device and a second terminal device. The first terminal device forwards the first data to the second terminal device.

20 Claims, 10 Drawing Sheets

(56) References Cited

U.S. PATENT DOCUMENTS

2020/0067533 A1* 2/2020 Wang ................ H03M 13/2778
2021/0136786 A1* 5/2021 Fong .................... H04L 1/0061

FOREIGN PATENT DOCUMENTS

| CN | 109547947 A | 3/2019 |
|---|---|---|
| CN | 110024319 A | 7/2019 |
| CN | 110072287 A | 7/2019 |
| EP | 4061023 A1 | 9/2022 |
| WO | 2010017475 A2 | 2/2010 |
| WO | 2019019822 A1 | 1/2019 |
| WO | 2019144812 A1 | 8/2019 |
| WO | 2020088665 A1 | 5/2020 |

OTHER PUBLICATIONS

Huawei et al., "Discussion on search space design for DL control channels", 3GPP TSG RAN WG1 Meeting #87, R1-1611211, Reno, NV, US, Nov. 14-18, 2016, 3 pages.

* cited by examiner

IMPLEMENTING DATA SCRAMBLING TRANSMISSION DURING USER COOPERATION TRANSMISSION

CROSS-REFERENCE TO RELATED APPLICATIONS

This application is a continuation of International Application No. PCT/CN2020/123272, filed on Oct. 23, 2020, which claims priority to Chinese Patent Application No. 201911019202.X, filed on Oct. 24, 2019. The disclosures of the aforementioned applications are hereby incorporated by reference in their entireties.

TECHNICAL FIELD

Embodiments of this application relate to the communication field, and in particular, to a data transmission method, a communication apparatus, and a communication system.

BACKGROUND

A 5th generation (5G) communication system supports various new wireless service types, such as the internet of things, autonomous driving, and the like. The 5G communication system further supports user cooperation transmission. Through user cooperation transmission, a capacity of the communication system and a network coverage area can be significantly increased, and load on a base station side can also be reduced.

In a conventional technology, during single-hop transmission (including uplink transmission and downlink transmission) on a Uu link, a scrambling code sequence may be determined based on a C-RNTI of a receive end, and then data may be scrambled by using the scrambling code sequence.

In a user cooperation transmission scenario, data sent by a base station arrives at a receive end, that is, target user equipment (TUE) through cooperation user equipment (CUE). Alternatively, data sent by target user equipment (SUE) arrives at a receive end, that is, a base station, through CUE. If a data channel is scrambled by using the scrambling code sequence that is determined by using the C-RNTI of the receive end, the CUE cannot decode the received data, and cannot cooperate with the TUE in receiving the data, or cannot cooperate with the SUE in sending the data. It can be learned that a data scrambling technology in an existing single-hop transmission scenario cannot be directly applied to the user cooperation transmission scenario.

SUMMARY

Embodiments of this application provide a data transmission method and a communication apparatus, to implement data scrambling transmission during user cooperation transmission and improve data transmission security during user cooperation transmission.

To achieve the foregoing objective, the following technical solutions are used in embodiments of this application.

According to a first aspect, a data transmission method is provided. The method includes: A first terminal device obtains first data from a network device based on a first identifier, where the first identifier is used to identify a first cooperation group, and the first cooperation group includes the first terminal device and a second terminal device. The first terminal device forwards the first data to the second terminal device.

In a downlink cooperation transmission scenario, a base station and a terminal device in a cooperation group specify an identifier of the cooperation group, and on the premise that the base station scrambles data by using the identifier of the cooperation group, CUE (for example, the first terminal device in this embodiment of this application) may descramble the data based on the identifier of the cooperation group, to cooperate with the base station in sending the data to TUE (for example, the second terminal device in this embodiment of this application). It can be learned that in the method provided in this embodiment of this application, data scrambling transmission during user cooperation transmission is implemented and data transmission security during user cooperation transmission is improved.

With reference to the first aspect, in a first possible implementation of the first aspect, the method further includes: The first terminal device receives the first identifier from the network device.

In the first aspect, the first terminal device may receive the first identifier from the network device, to descramble, based on the first identifier, the first data that is scrambled by the network device by using the first identifier.

With reference to the first aspect or the first possible implementation of the first aspect, in a second possible implementation of the first aspect, that a first terminal device obtains first data from a network device based on a first identifier includes: receiving a data packet from the network device, and descrambling the data packet based on a scrambling code sequence that is determined by using the first identifier, to obtain the first data.

In the first aspect, the first terminal device may descramble, based on the identifier of the cooperation group, the data packet sent by the network device, to obtain the data and send the data to the second terminal device, and cooperate with the network device in sending the data to the second terminal device.

With reference to the first or the second possible implementation of the first aspect, in a third possible implementation of the first aspect, the first identifier is a radio network temporary identifier RNTI, and the first identifier is different from an RNTI of the first terminal device and an RNTI of the second terminal device.

In the first aspect, the first identifier is the identifier of the cooperation group, and the identifier of the cooperation group may be a radio network temporary identifier, but is different from the RNTI of the first terminal device and the RNTI of the second terminal device. The identifier of the cooperation group is commonly known to the network device, the first terminal device, and the second terminal device. The network device may scramble the data by using the identifier of the cooperation group. The first terminal device may descramble, based on the identifier of the cooperation group, the data packet received from the network device, to forward the data to the second terminal device. Therefore, scrambling transmission is implemented in a user cooperation transmission scenario.

With reference to any one of the first to the third possible implementations of the first aspect, in a fourth possible implementation of the first aspect, an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

In the first aspect, a possible implementation of the first identifier is provided.

With reference to the first or the second possible implementation of the first aspect, in a fifth possible implementation of the first aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier is an integer that is greater than or equal to 0 and less than or equal to 31.

In the first aspect, the first identifier includes the first sub-identifier and the second sub-identifier, and the first sub-identifier and the second sub-identifier jointly identify one cooperation group. In addition, the first sub-identifier may be a radio network temporary identifier, but is different from the RNTI of the first terminal device and the RNTI of the second terminal device. The second sub-identifier may be an integer, and a length of a binary sequence of the second sub-identifier is 1 bit to 4 bits. The first sub-identifier and the second sub-identifier are commonly known to the network device, the first terminal device, and the second terminal device. The network device may scramble the data by using the scrambling code sequence that is determined by using the first sub-identifier and the second sub-identifier. The first terminal device may descramble, based on the first sub-identifier and the second sub-identifier, the data packet received from the network device, to forward the data to the second terminal device. Therefore, scrambling transmission is implemented in a user cooperation transmission scenario.

With reference to the fifth possible implementation of the first aspect, in a sixth possible implementation of the first aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and to least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the 17th bit to the $21^{st}$ bit of the initial sequence is a binary sequence of the second sub-identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

In the first aspect, a possible implementation of the first sub-identifier and the second sub-identifier is provided.

With reference to any one of the first aspect or the first to the sixth possible implementations of the first aspect, in a seventh possible implementation of the first aspect, that a first terminal device receives first data from a network device based on a first identifier includes: receiving the data packet from the network device, and descrambling the data packet based on a scrambling code sequence that is determined by using the first identifier and a second identifier, to obtain the first data, where the second identifier is used to identify the second terminal device.

In the first aspect, the identifier of the cooperation group and the identifier of the second terminal are commonly known to the network device, the first terminal device, and the second terminal device. The network device may scramble the data by using the scrambling code sequence that is determined by using the first identifier and the second identifier. The first terminal device may descramble, based on the first identifier and the second identifier, the data packet received from the network device, to forward the data to the second terminal device. Therefore, scrambling transmission is implemented in the user cooperation transmission scenario.

With reference to the sixth or the seventh possible implementation of the first aspect, in an eighth possible implementation of the first aspect, an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, to least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

In the first aspect, a possible implementation of the first identifier and the second identifier is provided.

With reference to the sixth or the seventh possible implementation of the first aspect, in a ninth possible implementation of the first aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, to least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

In the first aspect, a possible implementation of the first identifier and the second identifier is provided.

With reference to any one of the first aspect or the possible implementations of the first aspect, in a tenth possible implementation of the first aspect, the method further includes: The first terminal device receives the second identifier from the network device.

In the first aspect, the CUE may receive an identifier of the TUE from the network device. When the network device scrambles the data based on the identifier of the cooperation group and the identifier of the TUE, the CUE may decode, based on the identifier of the cooperation group and the identifier of the TUE, the data received from the network device.

With reference to any one of the first aspect or the possible implementations of the first aspect, in an eleventh possible implementation of the first aspect, the method further includes: The first terminal device receives control information from the network device, where the control information indicates the first terminal device to forward the first data to the second terminal device.

In the first aspect, the network device may explicitly indicate, by using the control information, the terminal device serving as the CUE to cooperate with the network device in sending the data to the TUE.

According to a second aspect, a data transmission method is provided. The method includes: A first terminal device obtains first data from a second terminal device based on a first identifier, where the first identifier is used to identify a first cooperation group, and the first cooperation group includes the first terminal device and a second terminal device. The first terminal device sends the first data to a network device.

In an uplink cooperation transmission scenario, a base station and a terminal device in a cooperation group specify an identifier of the cooperation group, and on the premise that the terminal device scrambles data by using the identifier of the cooperation group, CUE (for example, the first terminal device in this embodiment of this application) may descramble the data based on the identifier of the cooperation group, to cooperate with SUE (for example, the second terminal device in this embodiment of this application) in sending the data to the base station. It can be learned that in the method provided in this embodiment of this application, data scrambling transmission during user cooperation transmission is implemented and data transmission security during user cooperation transmission is improved.

With reference to the second aspect, in a first possible implementation of the second aspect, the method further includes: The first terminal device receives the first identifier from the network device.

In the second aspect, the first terminal device may receive the first identifier from the network device, to descramble, based on the first identifier, the first data that is scrambled by the second terminal device by using the first identifier.

With reference to the second aspect or the first possible implementation of the second aspect, in a second possible implementation of the second aspect, that a first terminal device obtains first data from a second terminal device based on a first identifier includes: receiving a data packet from the second terminal device, and descrambling the data packet based on a scrambling code sequence that is determined by using the first identifier, to obtain the first data.

In the second aspect, the first terminal device may descramble, based on the identifier of the cooperation group, the data packet sent by the network device, to obtain the data and send the data to the second terminal device, and cooperate with the network device in sending the data to the second terminal device.

With reference to the first or the second possible implementation of the first aspect, in a third possible implementation of the first aspect, the first identifier is a radio network temporary identifier RNTI, and the first identifier is different from an RNTI of the first terminal device and an RNTI of the second terminal device.

In the second aspect, the first identifier is the identifier of the cooperation group, and the identifier of the cooperation group may be a radio network temporary identifier, but is different from the RNTI of the first terminal device and the RNTI of the second terminal device. The identifier of the cooperation group is commonly known to the network device, the first terminal device, and the second terminal device. The second terminal device may scramble the data by using the identifier of the cooperation group. The first terminal device may descramble, based on the identifier of the cooperation group, the data packet received from the network device, to forward the data to the network device. Therefore, scrambling transmission is implemented in a user cooperation transmission scenario.

With reference to the first to the third possible implementations of the second aspect, in a fourth possible implementation of the second aspect, an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and 10 least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

In the second aspect, a possible implementation of the first identifier is provided.

With reference to the third or the fourth possible implementation of the second aspect, in a fifth possible implementation of the second aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier is an integer that is greater than or equal to 0 and less than or equal to 31.

In the second aspect, the first identifier includes the first sub-identifier and the second sub-identifier, and the first sub-identifier and the second sub-identifier jointly identify one cooperation group. In addition, the first sub-identifier may be a radio network temporary identifier, but is different from the RNTI of the first terminal device and the RNTI of the second terminal device. The second sub-identifier may be an integer, and a length of a binary sequence of the second sub-identifier is 1 bit to 4 bits. The first sub-identifier and the second sub-identifier are commonly known to the network device, the first terminal device, and the second terminal device. The second terminal device may scramble the data by using the scrambling code sequence that is determined by using the first sub-identifier and the second sub-identifier. The first terminal device may descramble, based on the first sub-identifier and the second sub-identifier, the data packet received from the second terminal device, to forward the data to the network device. Therefore, scrambling transmission is implemented in the user cooperation transmission scenario.

With reference to the fifth possible implementation of the second aspect, in a sixth possible implementation of the second aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and to least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the $17^{th}$ bit to the $21^{st}$ bit of the initial sequence is a binary sequence of the second sub-identifier, and 10 least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

In the second aspect, a possible implementation of the first sub-identifier and the second sub-identifier is provided.

With reference to any one of the second aspect or the first to the sixth possible implementations of the second aspect, in a seventh possible implementation of the second aspect, that a first terminal device obtains first data from a network device based on a first identifier includes: receiving the data packet from the second terminal device, and descrambling the data packet based on a scrambling code sequence that is determined by using the first identifier and a second identifier, to obtain the first data, where the second identifier is used to identify the second terminal device.

In the second aspect, the identifier of the cooperation group and the identifier of the second terminal are commonly known to the network device, the first terminal device, and the second terminal device. The second terminal device may scramble the data by using the scrambling code sequence that is determined by using the first identifier and the second identifier. The first terminal device may descramble, based on the first identifier and the second identifier, the data packet received from the second terminal device, to forward the data to the network device. Therefore, scrambling transmission is implemented in the user cooperation transmission scenario.

With reference to the sixth or the seventh possible implementation of the second aspect, in an eighth possible implementation of the second aspect, an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, to least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

In the second aspect, a possible implementation of the first identifier and the second identifier is provided.

With reference to the sixth or the seventh possible implementation of the second aspect, in a ninth possible implementation of the second aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, to least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

In the second aspect, a possible implementation of the first identifier and the second identifier is provided.

With reference to any one of the second aspect or the possible implementations of the second aspect, in a tenth possible implementation of the second aspect, the method further includes: receiving the second identifier from the network device.

In the second aspect, the CUE may receive an identifier of TUE from the network device. When the second terminal device scrambles the data based on the identifier of the cooperation group and the identifier of the TUE, the CUE may decode, based on the identifier of the cooperation group and the identifier of the TUE, the data received from the second terminal device.

With reference to any one of the second aspect or the possible implementations of the second aspect, in an eleventh possible implementation of the second aspect, the method further includes: receiving control information from the network device, where the control information indicates the first terminal device to forward the first data to the second terminal device.

In the second aspect, the network device may explicitly indicate, by using the control information, the terminal device serving as the CUE to cooperate with the network device in sending the data to the TUE.

According to a third aspect, a data transmission method is provided. The method includes: A network device scrambles first data by using a first identifier, where the first identifier is used to identify a first cooperation group, the first cooperation group includes a first terminal device and a second terminal device, and the first data is sent by the network device to the first terminal device. The network device sends the scrambled first data.

With reference to the third aspect, in a first possible implementation of the third aspect, the method further includes: The network device sends the first identifier to the first terminal device and the second terminal device.

With reference to the third aspect or the first possible implementation of the third aspect, in a second possible implementation of the third aspect, the first identifier is a radio network temporary identifier RNTI, and the first identifier is different from an RNTI of the first terminal device and an RNTI of the second terminal device.

With reference to the third aspect or the first or the second possible implementation of the third aspect, in a third possible implementation of the third aspect, that a network device or a second terminal device scrambles first data by using a first identifier includes: determining a scrambling code sequence based on the first identifier, and scrambling the first data by using the scrambling code sequence, where an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the third aspect or the first to the third possible implementations of the third aspect, in a fourth possible implementation of the third aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier may be an integer that is greater than or equal to 0 and less than or equal to 31.

With reference to the fourth possible implementation of the third aspect, in a fifth possible implementation of the third aspect, that a network device or a second terminal device scrambles first data by using a first identifier includes: determining a scrambling code sequence based on the first sub-identifier and the second sub-identifier, and scrambling the first data by using the scrambling code sequence, where an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and to least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the 17th bit to the $21^{st}$ bit of the initial sequence is a binary sequence of the second sub-identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the third aspect or the first to the fifth possible implementations of the third aspect, in a sixth possible implementation of the third aspect, that a network device or a second terminal device scrambles first data by using a first identifier includes: determining a scrambling code sequence based on the first identifier and a second identifier, and scrambling the first data by using the scrambling code sequence, where the second identifier is used to identify the second terminal device; and the determining a scrambling code sequence based on the first identifier and the second identifier includes: an initial sequence corresponding to the scrambling code sequence is a 31-bit binary sequence, 16 most significant bits of the initial sequence are a binary sequence of the first identifier, the 17th bit of the initial sequence is a binary sequence of a transport block quantity identifier, to least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, to least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

With reference to any one of the third aspect or the first to the fifth possible implementations of the third aspect, in a seventh possible implementation of the third aspect, that a network device scrambles first data by using a first identifier includes: determining a scrambling code sequence based on the first sub-identifier, the second sub-identifier, and a second identifier, and scrambling the first data by using the scrambling code sequence, where the first identifier includes the first sub-identifier and the second sub-identifier, and the second identifier is used to identify the second terminal device; and the determining a scrambling code sequence based on the second identifier and a second identifier includes: an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, to least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

With reference to the sixth or the seventh possible implementation of the third aspect, in an eighth possible implementation of the third aspect, the method further includes: The network device sends the second identifier to the first terminal device and the second terminal device.

With reference to any one of the third aspect or the possible implementations of the third aspect, in a ninth possible implementation of the third aspect, the method further includes: The network device sends control information to the first terminal device, where the control information indicates the first terminal device to forward the first data to the second terminal device.

According to a fourth aspect, a data transmission method is provided. The method includes: A second terminal device scrambles first data by using a first identifier, where the first identifier is used to identify a first cooperation group, the first cooperation group includes a first terminal device and the second terminal device, and the first data is sent by the second terminal device to the first terminal device. The second terminal device sends the scrambled first data.

With reference to the fourth aspect, in a first possible implementation of the fourth aspect, the method further includes: The second terminal device receives the first identifier from a network device.

With reference to the fourth aspect or the first possible implementation of the fourth aspect, in a second possible implementation of the fourth aspect, the first identifier is a radio network temporary identifier RNTI, and the first identifier is different from an RNTI of the first terminal device and an RNTI of the second terminal device.

With reference to the fourth aspect or the first or the second possible implementation of the fourth aspect, in a third possible implementation of the fourth aspect, that a network device or a second terminal device scrambles first data by using a first identifier includes: determining a scrambling code sequence based on the first identifier, and scrambling the first data by using the scrambling code sequence, where an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the fourth aspect or the first to the third possible implementations of the fourth aspect, in a fourth possible implementation of the fourth aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier may be an integer that is greater than or equal to 0 and less than or equal to 31.

With reference to the fourth possible implementation of the fourth aspect, in a fifth possible implementation of the fourth aspect, that a network device or a second terminal device scrambles first data by using a first identifier includes: determining a scrambling code sequence based on the first sub-identifier and the second sub-identifier, and scrambling the first data by using the scrambling code sequence, where an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and 10 least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the 17th bit to the $21^{st}$ bit of the initial sequence is a binary sequence of the second sub-identifier, and 10 least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the fourth aspect or the first to the fifth possible implementations of the fourth aspect, in a sixth possible implementation of the fourth aspect, that a network device or a second terminal device scrambles first data by using a first identifier includes: determining a scrambling code sequence based on the first identifier and a second identifier, and scrambling the first data by using the scrambling code sequence, where the second identifier is used to identify the second terminal device; and the determining a scrambling code sequence based on the first identifier and a second identifier includes: an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, 10 least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, 10 least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

With reference to any one of the fourth aspect or the first to the fifth possible implementations of the fourth aspect, in a seventh possible implementations of the fourth aspect, that a network device or a terminal device scrambles first data by using a first identifier includes: determining a scrambling code sequence based on the first sub-identifier, the second sub-identifier, and a second identifier, and scrambling the first data by using the scrambling code sequence, where the first identifier includes the first sub-identifier and the second sub-identifier, and the second identifier is used to identify the second terminal device; and the determining a scrambling code sequence based on the second identifier and a second identifier includes: an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, 10 least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, to least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

With reference to the sixth or the seventh possible implementation of the fourth aspect, in an eighth possible implementation of the fourth aspect, the method further includes: The second terminal device receives the second identifier from the network device.

According to a fifth aspect, a communication apparatus is provided. The communication apparatus may be a first terminal device, a component that implements a function of the foregoing terminal device in the first terminal device, or a chip applied to the first terminal device. The communication apparatus includes: a processing unit, configured to obtain first data from a network device based on a first identifier, where the first identifier is used to identify a first cooperation group, and the first cooperation group includes the first terminal device and a second terminal device; and a transceiver unit, configured to forward the first data to the second terminal device.

With reference to the fifth aspect, in a first possible implementation of the fifth aspect, the transceiver unit is further configured to receive the first identifier from the network device.

With reference to the fifth aspect or the first possible implementation of the fifth aspect, in a second possible implementation of the fifth aspect, the transceiver unit is further configured to receive a data packet from the network device; and the processing unit is specifically configured to descramble the data packet based on a scrambling code sequence that is determined by using the first identifier, to obtain the first data.

In the fifth aspect, the first terminal device may descramble, based on an identifier of a cooperation group, the data packet sent by the network device, to obtain the data and send the data to the second terminal device, and cooperate with the network device in sending the data to the second terminal device.

With reference to the first or the second possible implementation of the fifth aspect, in a third possible implementation of the fifth aspect, the first identifier is a radio network temporary identifier RNTI, and the first identifier is different from an RNTI of the first terminal device and an RNTI of the second terminal device.

With reference to any one of the first to the third possible implementations of the fifth aspect, in a fourth possible implementation of the fifth aspect, an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and 10 least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to the first or the second possible implementation of the fifth aspect, in a fifth possible implementation of the fifth aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier is an integer that is greater than or equal to 0 and less than or equal to 31.

With reference to the fifth possible implementation of the fifth aspect, in a sixth possible implementation of the fifth aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and to least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the 17th bit to the $21^{st}$ bit of the initial sequence is a binary sequence of the second sub-identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the fifth aspect or the first to the sixth possible implementations of the fifth aspect, in a seventh possible implementation of the fifth aspect, the transceiver unit is configured to receive the data packet from the network device; and the processing unit is specifically configured to descramble the data packet based on a scrambling code sequence that is determined by using the first identifier and a second identifier, to obtain the first data, where the second identifier is used to identify the second terminal device.

With reference to the sixth or the seventh possible implementation of the fifth aspect, in an eighth possible implementation of the fifth aspect, a length of an initial sequence corresponding to the scrambling code sequence is 31 bits, 16 most significant bits of the initial sequence are a binary sequence of the first identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, to least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

With reference to the sixth or the seventh possible implementation of the fifth aspect, in a ninth possible implementation of the fifth aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, to least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

With reference to any one of the fifth aspect or the possible implementations of the fifth aspect, in a tenth possible implementation of the fifth aspect, the transceiver unit is further configured to receive the second identifier from the network device.

With reference to any one of the fifth aspect or the possible implementations of the fifth aspect, in an eleventh possible implementation of the fifth aspect, the transceiver unit is further configured to receive control information from the network device, where the control information indicates the first terminal device to forward the first data to the second terminal device.

According to a sixth aspect, a communication apparatus is provided. The communication apparatus may be a first terminal device, a component that implements a function of the foregoing terminal device in the first terminal device, or a chip applied to the first terminal device. The communication apparatus includes: a processing unit, configured to obtain first data from a second terminal device based on a first identifier, where the first identifier is used to identify a first cooperation group, and the first cooperation group includes the first terminal device and the second terminal device; and a transceiver unit, configured to send the first data to a network device.

With reference to the sixth aspect, in a first possible implementation of the sixth aspect, the transceiver unit is further configured to receive the first identifier from the network device.

With reference to the sixth aspect or the first possible implementation of the sixth aspect, in a second possible implementation of the sixth aspect, the transceiver unit is further configured to receive a data packet from the second terminal device, and the processing unit is specifically configured to descramble the data packet based on a scrambling code sequence that is determined by using the first identifier, to obtain the first data.

With reference to the first or the second possible implementation of the fifth aspect, in a third possible implementation of the fifth aspect, the first identifier is a radio network temporary identifier RNTI, and the first identifier is different from an RNTI of the first terminal device and an RNTI of the second terminal device.

With reference to the first to the third possible implementations of the sixth aspect, in a fourth possible implementation of the sixth aspect, an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to the third or the fourth possible implementation of the sixth aspect, in a fifth possible implementation of the sixth aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier is an integer that is greater than or equal to 0 and less than or equal to 31.

In the sixth aspect, the first identifier includes the first sub-identifier and the second sub-identifier, and the first sub-identifier and the second sub-identifier jointly identify one cooperation group. In addition, the first sub-identifier may be a radio network temporary identifier, but is different from the RNTI of the first terminal device and the RNTI of the second terminal device. The second sub-identifier may be an integer, and a length of a binary sequence of the second sub-identifier is 1 bit to 4 bits. The first sub-identifier and the second sub-identifier are commonly known to the network device, the first terminal device, and the second terminal device. The second terminal device may scramble the data by using the scrambling code sequence that is determined by using the first sub-identifier and the second sub-identifier. The first terminal device may descramble, based on the first sub-identifier and the second sub-identifier, the data packet received from the second terminal device, to forward the data to the network device. Therefore, scrambling transmission is implemented in a user cooperation transmission scenario.

With reference to the fifth possible implementation of the sixth aspect, in a sixth possible implementation of the sixth aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and to least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the 17th bit to the $21^{st}$ bit of the initial sequence is a binary sequence of the second sub-identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to the sixth aspect or the first to the sixth possible implementations of the sixth aspect, in a seventh possible implementation of the sixth aspect, the transceiver unit is configured to receive the data packet from the second terminal device; and the processing unit is specifically configured to descramble the data packet based on a scrambling code sequence that is determined by using the first identifier and a second identifier, to obtain the first data, where the second identifier is used to identify the second terminal device.

With reference to the sixth or the seventh possible implementation of the sixth aspect, in an eighth possible implementation of the sixth aspect, a length of an initial sequence corresponding to the scrambling code sequence is 31 bits, 16 most significant bits of the initial sequence are a binary sequence of the first identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, to least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

With reference to the sixth or the seventh possible implementation of the sixth aspect, in a ninth possible implementation of the sixth aspect, an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, 10 least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

With reference to any one of the sixth aspect or the possible implementations of the sixth aspect, in a tenth possible implementation of the sixth aspect, the transceiver unit is further configured to receive the second identifier from the network device.

With reference to any one of the sixth aspect or the possible implementations of the sixth aspect, in an eleventh possible implementation of the sixth aspect, the transceiver unit is further configured to receive control information from the network device, where the control information indicates the first terminal device to forward the first data to the second terminal device.

According to a seventh aspect, a communication apparatus is provided. The communication apparatus may be a network device, a component that implements the foregoing network function is in the network device, or a chip applied to the network device. The communication apparatus includes: a processing unit, configured to scramble first data by using a first identifier, where the first identifier is used to identify a first cooperation group, the first cooperation group includes a first terminal device and a second terminal device, and the first data is sent by the network device to the first terminal device; and a transceiver unit, configured to send the scrambled first data.

With reference to the seventh aspect, in a first possible implementation of the seventh aspect, the transceiver unit is further configured to send the first identifier to the first terminal device and the second terminal device.

With reference to the seventh aspect or the first possible implementation of the seventh aspect, in a second possible implementation of the seventh aspect, the first identifier is a radio network temporary identifier RNTI, and the first identifier is different from an RNTI of the first terminal device and an RNTI of the second terminal device.

With reference to the seventh aspect or the first or the second possible implementation of the seventh aspect, in a third possible implementation of the seventh aspect, the processing unit is configured to: determine a scrambling code sequence based on the first identifier, and scramble the first data by using the scrambling code sequence, where an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the seventh aspect or the first to the third possible implementations of the seventh aspect, in a fourth possible implementation of the seventh aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier may be an integer that is greater than or equal to 0 and less than or equal to 31.

With reference to the fourth possible implementation of the seventh aspect, in a fifth possible implementation of the seventh aspect, the processing unit is configured to: determine a scrambling code sequence based on the first sub-identifier and the second sub-identifier, and scramble the first data by using the scrambling code sequence, where an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and to least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the $17^{th}$ bit to the $21^{st}$ bit of the initial sequence is a binary sequence of the second sub-identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the seventh aspect or the first to the fifth possible implementations of the seventh aspect, in a sixth possible implementation of the seventh aspect, the processing unit is specifically configured to: determine a scrambling code sequence based on the first identifier and a second identifier, and scramble the first data by using the scrambling code sequence, where the second identifier is used to identify the second terminal device; and the determining a scrambling code sequence based on the first identifier and a second identifier includes: an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, to least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

With reference to any one of the seventh aspect or the first to the fifth possible implementations of the seventh aspect, in a seventh possible implementation of the seventh aspect, the processing unit is specifically configured to: determine a scrambling code sequence based on the first sub-identifier, the second sub-identifier, and a second identifier, and scramble the first data by using the scrambling code sequence, where the first identifier includes the first sub-identifier and the second sub-identifier, and the second identifier is used to identify the second terminal device; and the determining a scrambling code sequence based on the second identifier and a second identifier includes: an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, to least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

With reference to the sixth or the seventh possible implementation of the seventh aspect, in an eighth possible implementation of the seventh aspect, the transceiver unit is further configured to send the second identifier to the first terminal device and the second terminal device.

With reference to any one of the seventh aspect or the possible implementations of the seventh aspect, in a ninth possible implementation of the seventh aspect, the transceiver unit is further configured to send control information to the first terminal device, where the control information indicates the first terminal device to forward the first data to the second terminal device.

According to an eighth aspect, a communication apparatus is provided. The communication apparatus may be a second terminal device, a component that implements a function of the foregoing terminal device in the second terminal device, or a chip applied to the second terminal device. The communication apparatus includes: a processing unit, configured to scramble first data by using a first identifier, where the first identifier is used to identify a first cooperation group, the first cooperation group includes a first terminal device and the second terminal device, and the first data is sent by the second terminal device to the first terminal device; and a transceiver unit, configured to send the scrambled first data.

With reference to the eighth aspect, in a first possible implementation of the eighth aspect, the transceiver unit is further configured to receive the first identifier from a network device.

With reference to the eighth aspect or the first possible implementation of the eighth aspect, in a second possible implementation of the eighth aspect, the first identifier is a radio network temporary identifier RNTI, and the first identifier is different from an RNTI of the first terminal device and an RNTI of the second terminal device.

With reference to the eighth aspect or the first or the second possible implementation of the eighth aspect, in a third possible implementation of the eighth aspect, the processing unit is specifically configured to: determine a scrambling code sequence based on the first identifier, and scramble the first data by using the scrambling code sequence, where an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the eighth aspect or the first to the third possible implementations of the eighth aspect, in a fourth possible implementation of the eighth aspect, the first identifier includes a first sub-identifier and a second sub-identifier, the first sub-identifier is an RNTI, the first sub-identifier is different from an RNTI of the first terminal device and an RNTI of the second terminal device, and the second sub-identifier may be an integer that is greater than or equal to 0 and less than or equal to 31.

With reference to the fourth possible implementation of the eighth aspect, in a fifth possible implementation of the eighth aspect, the processing unit is specifically configured to: determine a scrambling code sequence based on the first sub-identifier and the second sub-identifier, and scramble the first data by using the scrambling code sequence, where an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, at least one of the $18^{th}$ bit to the $21^{st}$ bit of the scrambling code sequence is a binary sequence of the second sub-identifier, and to least significant bits of the initial sequence are a binary sequence of a data scrambling identifier; or an initial sequence corresponding to the scrambling code sequence is a 31-bit binary sequence, 16 most significant bits of the initial sequence are a binary sequence of the first sub-identifier, at least one of the $17^{th}$ bit to the $21^{st}$ bit of the initial sequence is a binary sequence of the second sub-identifier, and to least significant bits of the initial sequence are a binary sequence of a data scrambling identifier, where the transport block quantity identifier is used to indicate a quantity of transport blocks included in the first data, and the data scrambling identifier is configured by the network device, or the data scrambling identifier is a physical layer cell identifier.

With reference to any one of the eighth aspect or the first to the fifth possible implementations of the eighth aspect, in a sixth possible implementation of the eighth aspect, the processing unit is specifically configured to: determine a scrambling code sequence based on the first identifier and a second identifier, and scramble the first data by using the scrambling code sequence, where the second identifier is used to identify the second terminal device; and the determining a scrambling code sequence based on the first identifier and a second identifier includes: an initial sequence corresponding to the scrambling code sequence is a 31-bit binary sequence, 16 most significant bits of the initial sequence are a binary sequence of the first identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the initial sequence is a binary sequence of the second identifier; or an initial sequence corresponding to the scrambling code sequence is a 31-bit binary sequence, 16 most significant bits of the initial sequence are a binary sequence of the first identifier, to least significant bits of the initial sequence are a binary sequence of a data scrambling identifier, and at least one of the $17^{th}$ bit to the $21^{st}$ bit of the initial sequence is a binary sequence of the second identifier, where the transport block quantity identifier is used to indicate a quantity of transport blocks included in the first data, and the data scrambling identifier is configured by the network device, or the data scrambling identifier is a physical layer cell identifier.

With reference to any one of the eighth aspect or the first to the fifth possible implementations of the eighth aspect, in a seventh possible implementation of the eighth aspect, the processing unit is specifically configured to: determine a scrambling code sequence based on the first sub-identifier, the second sub-identifier, and a second identifier, and scramble the first data by using the scrambling code sequence, where the first identifier includes the first sub-identifier and the second sub-identifier, and the second identifier is used to identify the second terminal device; and an initial sequence corresponding to the scrambling code sequence is a 31-bit binary sequence, 16 most significant bits of the initial sequence are a binary sequence of the first sub-identifier, the $17^{th}$ bit of the initial sequence is a binary sequence of a transport block quantity identifier, to least significant bits of the initial sequence are a binary sequence of a data scrambling identifier, and at least one of the $18^{th}$ bit to the $21^{st}$ bit of the scrambling code sequence is a binary sequence of the second identifier and a binary sequence of the second sub-identifier; or an initial sequence corresponding to the scrambling code sequence is a 31-bit binary sequence, 16 most significant bits of the initial sequence are a binary sequence of the first sub-identifier, 10 least significant bits of the initial sequence are a binary sequence of a data scrambling identifier, and at least one of the $17^{th}$ bit to the $21^{st}$ bit of the initial sequence is a binary sequence of the second identifier and a binary sequence of the second sub-identifier, where the transport block quantity identifier is used to indicate a quantity of transport blocks included in the first data, and the data scrambling identifier is configured by the network device, or the data scrambling identifier is a physical layer cell identifier.

With reference to the sixth or the seventh possible implementation of the eighth aspect, in an eighth possible implementation of the eighth aspect, the transceiver unit is further configured to receive the second identifier from the network device.

It should be noted that, when the communication apparatus is a network device, a terminal device, or a combined component that can implement functions of the network device and the terminal device, the transceiver unit module may be a transceiver, and may include an antenna, a radio frequency circuit, and the like, and the transceiver may be integration of a transmitter and a receiver; and the processing module may be a processor, for example, a baseband chip. When the communication apparatus is a component having functions of the network device and the terminal device, the transceiver unit may be a radio frequency unit, and the processing module may be a processor. When the communication apparatus is a chip system, the transceiver unit may be an input/output interface of the chip system, and the processing module may be a processor in the chip system, for example, a central processing unit (CPU).

According to a ninth aspect, a communication apparatus is provided, including at least one processor and a memory, where the at least one processor is coupled to the memory; and the memory is configured to store a computer program. The at least one processor is configured to execute the computer program stored in the memory, so that the apparatus performs the method according to any one of the second aspect or the implementations of the second aspect, the method according to any one of the first aspect or the implementations of the first aspect, the method according to any one of the third aspect or the implementations of the third aspect, or the method according to any one of the fourth aspect or the implementations of the fourth aspect.

According to a tenth aspect, a computer-readable storage medium is provided. The computer-readable storage medium stores instructions. When the computer-readable storage medium runs on the communication apparatus according to any one of the fifth aspect or the implementations of the fifth aspect or any one of the sixth aspect or the implementations of the sixth aspect, the communication apparatus is enabled to perform the communication method according to any one of the first aspect or the implementations of the first aspect or the communication method according to any one of the second aspect or the implementations of the second aspect.

According to an eleventh aspect, a computer-readable storage medium is provided. The computer-readable storage medium stores instructions. When the computer-readable storage medium runs on the communication apparatus according to any one of the seventh aspect or the implementations of the seventh aspect, the communication apparatus is enabled to perform the communication method according to any one of the third aspect or the implementations of the third aspect.

According to a twelfth aspect, a computer-readable storage medium is provided. The computer-readable storage medium stores instructions. When the computer-readable storage medium runs on the communication apparatus according to any one of the eighth aspect or the implementations of the eighth aspect, the communication apparatus is enabled to perform the communication method according to any one of the fourth aspect or the implementations of the fourth aspect.

According to a thirteenth aspect, a wireless communication apparatus is provided. The communication apparatus includes a processor, for example, applied to a communication apparatus, and is configured to implement the method according to any one of the first aspect or the implementations of the first aspect or the function or the method according to any one of the second aspect or the implementations of the second aspect. The communication apparatus may be, for example, a chip system. In a feasible implementation, the chip system further includes a memory. The memory is configured to store program instructions and data that are necessary for implementing the function of the methods according to the first aspect and the second aspect.

According to a fourteenth aspect, a wireless communication apparatus is provided. The communication apparatus includes a processor, for example, applied to a communication apparatus, and is configured to implement a function or a method in the method according to any one of the third aspect or the implementations of the third aspect. The communication apparatus may be, for example, a chip system. In a feasible implementation, the chip system further includes a memory. The memory is configured to store program instructions and data that are necessary for implementing the function of the method according to the third aspect.

According to a fifteenth aspect, a wireless communication apparatus is provided. The communication apparatus includes a processor, for example, applied to a communication apparatus, and is configured to implement a function or a method in the method according to any one of the fourth aspect or the implementations of the fourth aspect. The communication apparatus may be, for example, a chip system. In a feasible implementation, the chip system further includes a memory. The memory is configured to store program instructions and data that are necessary for implementing the function of the method according to the fourth aspect.

The chip system in the foregoing aspects may be a system-on-a-chip (system on chip, SOC), may be a baseband chip, or the like. The baseband chip may include a processor, a channel encoder, a digital signal processor, a modem, an interface module, or the like.

According to a sixteenth aspect, a communication system is provided, including a network device, a first terminal device, and a second terminal device. The network device is configured to: scramble first data by using a first identifier, and send the scrambled first data, where the first identifier is used to identify a first cooperation group, the first cooperation group includes the first terminal device and the second terminal device, and the first data is sent by the network device to the first terminal device.

The first terminal device is configured to: obtain the first data from the network device based on the first identifier, and forward the first data to the second terminal device.

Alternatively, the second terminal device is configured to: scramble first data by using a first identifier, and send the scrambled first data, where the first identifier is used to identify a first cooperation group, the first cooperation group includes the first terminal device and the second terminal device, and the first data is sent by the second terminal device to the first terminal device.

The first terminal device is configured to: obtain the first data from the second terminal device based on the first identifier, and send the first data to the network device. Further, the network device is configured to implement a function of the communication apparatus according to any one of the seventh aspect or the implementations of the seventh aspect. The first terminal device is configured to implement a function of the communication apparatus according to any one of the fifth aspect or the implementations of the fifth aspect or any one of the sixth aspect or the implementations of the second aspect. The second terminal device is configured to implement a function of the communication apparatus according to any one of the eighth aspect or the implementations of the eighth aspect.

According to a seventeenth aspect, a communication system is provided, including a first terminal device and a second terminal device. The first terminal device is configured to: obtain first data from a network device based on a first identifier, and forward the first data to the second terminal device, where the first identifier is used to identify a first cooperation group, the first cooperation group includes the first terminal device and the second terminal device, the first data is sent by the network device to the first terminal device, and the network device scrambles the first data by using the first identifier.

Alternatively, the second terminal device is configured to: scramble first data by using a first identifier, and send the scrambled first data, where the first identifier is used to identify a first cooperation group, the first cooperation group includes the first terminal device and the second terminal device, and the first data is sent by the second terminal device to the first terminal device.

The first terminal device is configured to: obtain the first data from the second terminal device based on the first identifier, and send the first data to the network device. Further, the first terminal device is configured to implement a function of the communication apparatus according to any one of the fifth aspect or the implementations of the fifth aspect or any one of the sixth aspect or the implementations of the second aspect. The second terminal device is configured to implement a function of the communication apparatus according to any one of the eighth aspect or the implementations of the eighth aspect.

DETAILED DESCRIPTION OF ILLUSTRATIVE EMBODIMENTS

The following describes technical solutions of this application with reference to the accompanying drawings.

First, terms used in embodiments of this application are explained and described.

(1) UE Cooperation Transmission

User cooperation transmission means that one terminal device cooperates with another terminal device in completing data transmission, and can significantly increase a system capacity and a network coverage area. For example, a terminal device 1 is located at a cell edge with weak coverage, and a base station may send data to a terminal device 2 in a strong-coverage area, and the terminal device 2 forwards the data to the terminal device 1.

Figure 1:
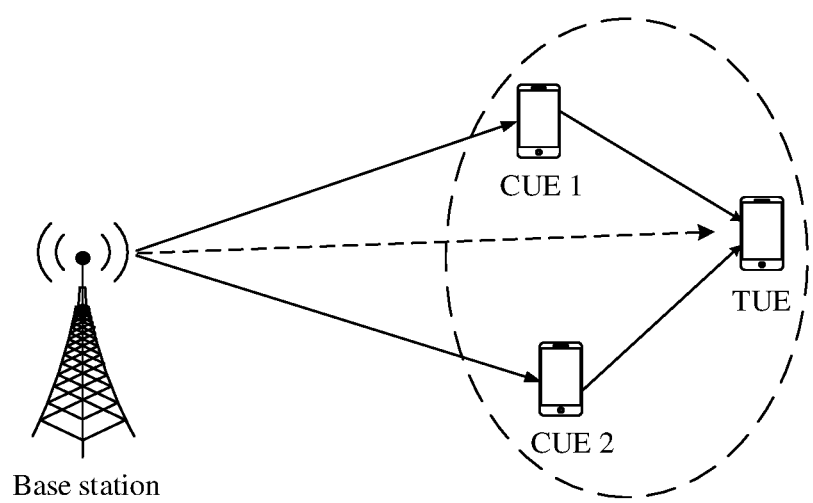
FIG. 1 is a schematic diagram of downlink user cooperation transmission according to an embodiment of this application.

FIG. 1 is a scenario of downlink user cooperation transmission. A base station may send data to cooperation user equipment (CUE) and target user equipment (TUE). The CUE may send the received data to the TUE through a sidelink (sidelink). The TUE may jointly decode the data from the base station and the data from the CUE, to improve data receiving performance.

For example, with reference to FIG. 1, the base station prepares data that needs to be sent to the TUE, and sends the data to the TUE, CUE 1, and CUE 2. The CUE 1 and the CUE 2 send the received data to the TUE. The TUE may jointly decode the data from the base station, the data from the CUE 1, and the data from the CUE 2.

Figure 2:
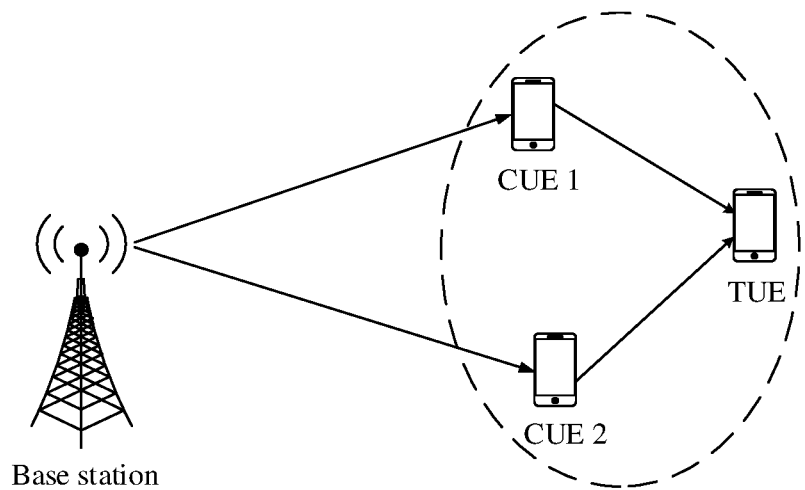
FIG. 2 is another schematic diagram of downlink user cooperation transmission according to an embodiment of this application.

FIG. 2 is another scenario of downlink user cooperation transmission. A base station sends data to only CUE, the CUE may send the received data to TUE through a sidelink, and the TUE receives the data from the CUE.

For example, with reference to FIG. 2, the base station prepares data that needs to be sent to the TUE, and sends the data to CUE 1 and CUE 2. The CUE 1 and the CUE 2 send the received data to the TUE. The TUE may jointly decode the data from the CUE 1 and the data from the CUE 2.

In a downlink user cooperation transmission scenario, the TUE and several CUEs serving the TUE form a user cooperation group (UC group). For example, the TUE, the CUE 1, and the CUE 2 in FIG. 1 or FIG. 2 form a user cooperation group. It should be noted that one user cooperation group includes only one TUE. One UE may be TUE in a user cooperation group, and may also be CUE in another user cooperation group. There may be a plurality of different user cooperation groups in a same cell.

Figure 3:
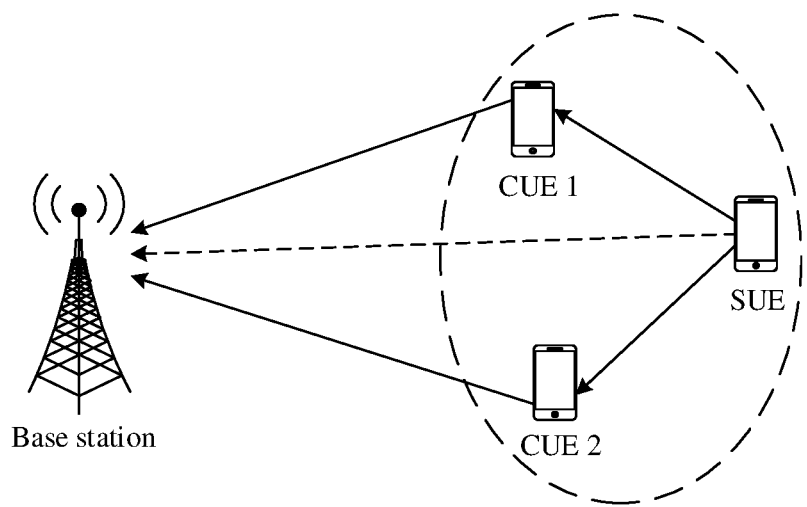
FIG. 3 is a schematic diagram of uplink user cooperation transmission according to an embodiment of this application.

FIG. 3 is a scenario of uplink user cooperation transmission. Source user equipment (SUE) may send data to CUE and a base station. The CUE may send the received data to the base station through a cellular link (Uu link). The base station may jointly decode the data from the SUE and the data from the CUE, to improve data receiving performance.

For example, with reference to FIG. 3, the SUE prepares data that needs to be sent to the base station, and sends the data to the base station, CUE 1, and CUE 2. The CUE 1 and the CUE 2 send the received data to the base station. The base station may jointly decode the data from the SUE, the data from the CUE 1, and the data from the CUE 2.

Figure 4:
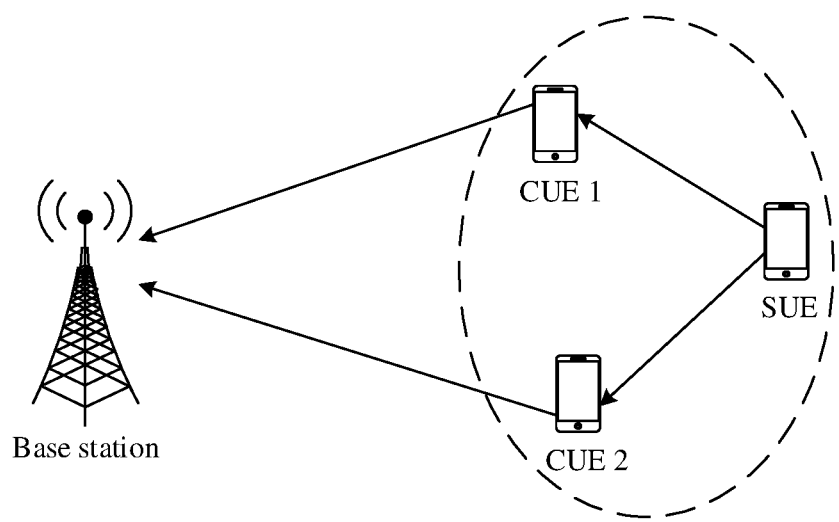
FIG. 4 is another schematic diagram of uplink user cooperation transmission according to an embodiment of this application.

FIG. 4 is another scenario of uplink user cooperation transmission. SUE sends data to only CUE, the CUE may send the received data to a base station through a cellular link, and the base station receives the data from the CUE.

For example, with reference to FIG. 4, the SUE prepares data that needs to be sent to the base station, and sends the data to CUE 1 and CUE 2. The CUE 1 and the CUE 2 send the received data to the base station. The base station may jointly decode the data from the CUE 1 and the data from the CUE 2.

In an uplink user cooperation transmission scenario, the SUE and several CUEs serving the SUE form a user cooperation group. For example, the SUE, the CUE 1, and the CUE 2 in FIG. 3 or FIG. 4 form a user cooperation group. It should be noted that one user cooperation group includes only one SUE. One UE may be SUE in a user cooperation group, and may also be CUE in another user cooperation group.

(2) RNTI (Radio Network Temporary Identifier)

The RNTI is an identifier that is agreed on between user equipment and a base station and that is used to distinguish between different user equipments, and the RNTI may be used to distinguish between the different user equipments. A C-RNTI (cell-RNTI) is a common RNTI, and may indicate service information of user equipment.

(3) Scrambling

During existing single-hop transmission, a transmit end may multiply a pseudo random binary sequence and to-be-sent data, and scramble the data, to encrypt the data to prevent the data from being tampered with in a transmission process. The used pseudo random binary sequence may be referred to as a scrambling code sequence.

Downlink transmission on a Uu link is used as an example. A base station needs to scramble, by using a scrambling code sequence, data mapped to a physical downlink data channel (PDSCH). The scrambling code sequence is a bit sequence with a length of 31 bits, and is specifically obtained by performing a modulo 2 operation on a sequence X1 plus a sequence X2. The sequence X1 is determined according to a protocol (3GPP TS 38.211). Generally, the sequence X1 is unchanged, and an initial value of the sequence X2 satisfies:

$$c_{init} = n_{RNTI} 2^{15} + q g 2^{14} + n_{ID}.$$

$n_{RNTI}$ is an RNTI associated with PDSCH transmission, that is, an RNTI of a terminal receiving the PDSCH.

A value of q is 0 or 1. When q=0, the base station performs single-codeword transmission, that is, data sent by the base station to the terminal includes one transport block (transport block, TB) for transmission. When q=1, the base station performs two-codeword transmission, that is, data sent by the base station includes two transport blocks (transport blocks, TBs) for transmission.

$n_{ID}$ is a higher layer configuration parameter dataScramblingIdentityPDSCH or $N_{ID}^{cell}$. A value of the higher layer configuration parameter is $\{0, 1, \ldots, 1023\}$. When the parameter is configured, the following conditions need to be met: the RNTI is equal to a C-RNTI, an MCS-C-RNTI (modulation coding scheme cell RNTI), or a CS-RNTI (configured scheduling RNTI); and a network device does not schedule the terminal device in common search space by using a DCI format 1_0. In other conditions, $n_{ID}=N_{ID}^{cell}$, and $N_{ID}^{cell}$ is a physical layer cell ID, that is, an ID of a cell of the base station that sends the PDSCH.

Figure 5:
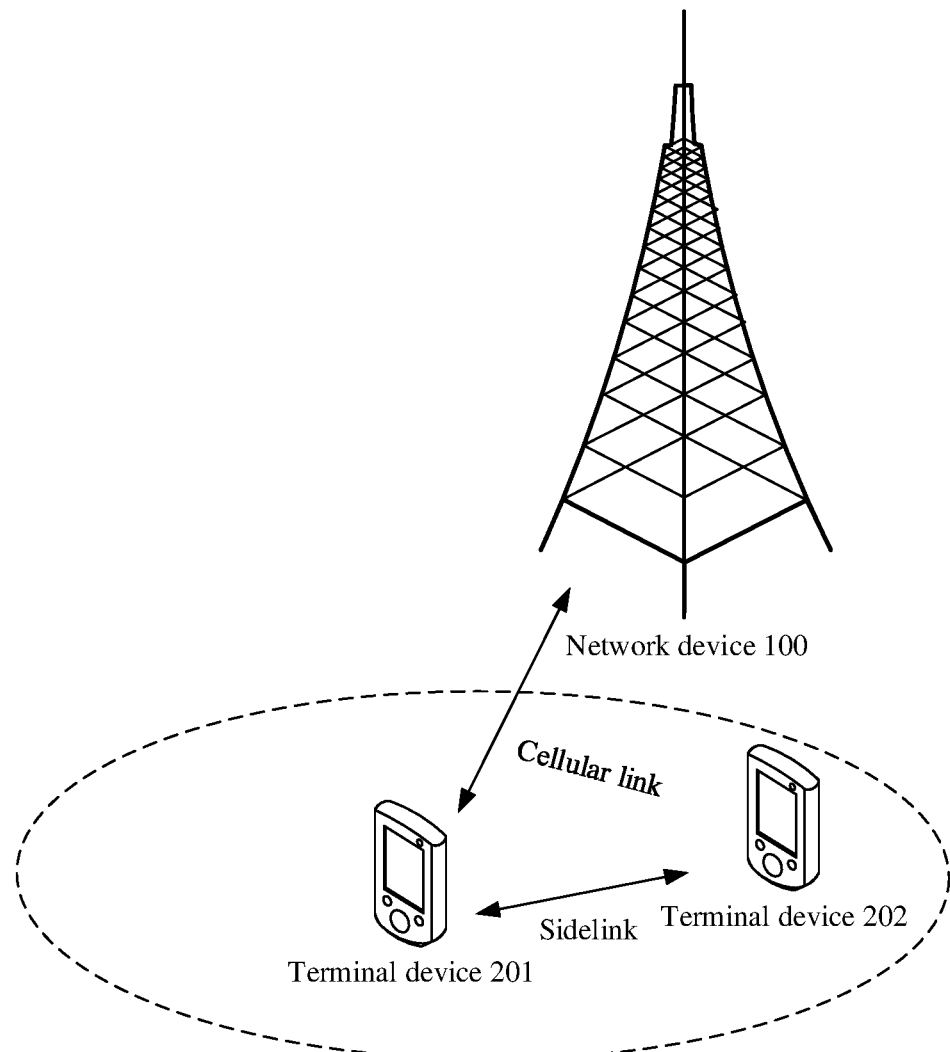
FIG. 5 is a diagram of an architecture of a communication system according to an embodiment of this application.

FIG. 5 is a schematic diagram of a communication system to which technical solutions provided in this application are applicable. The communication system may include a plurality of network devices (where only a network device 100 is shown) and a plurality of terminal devices (where only a terminal device 201 and a terminal device 202 are shown in the figure). FIG. 5 is merely a schematic diagram, and does not constitute any limitation on a scenario to which the technical solutions provided in this application are applicable.

Uplink and downlink transmission may be performed between the network device and the terminal device through a cellular link (a Uu link), and communication may be performed between the terminal devices through a sidelink (a sidelink link), for example, D2D communication, V2X communication, or machine type communication (MTC).

Cooperation transmission may further be performed between the network device 100 and the terminal device. For example, the terminal device 201 and the terminal device 202 may form a user cooperation group. During downlink transmission, the terminal device 201 serves as CUE, and the terminal device 202 serves as TUE. The network device sends data to the terminal device 201, and the terminal device 201 sends the data to the terminal device 202 after receiving the data from the network device. During uplink transmission, the terminal device 201 serves as CUE, and the terminal device 202 serves as SUE. The terminal device 202 sends data to the terminal device 201, and the terminal device 201 sends the data to the network device after receiving the data from the terminal device 202.

The network device too may be any device having a wireless transceiver function. The network device includes but is not limited to: an evolved NodeB (NodeB, eNB, or e-NodeB, evolutional NodeB) in LTE, a base station (gNodeB or gNB) or a transmission reception point (transmission receiving point/transmission reception point, TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support networks that use a same technology mentioned above, or may support networks that use different technologies mentioned above. The base station may include one or more co-site or non-co-site TRPs. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with the terminal device, or may communicate with the terminal device through a relay station. The terminal device may communicate with a plurality of base stations using different technologies. For example, the terminal device may communicate with a base station supporting an LTE network, may communicate with a base station supporting a 5G network, or may support a dual connection to the base station supporting the LTE network and the base station supporting the 5G network.

The terminal device (for example, the terminal device 201 or the terminal device 202) is a device having a wireless transceiver function, and may be deployed on land, including an indoor device or an outdoor device, a handheld device, a wearable device, or a vehicle-mounted device, may be deployed on water (for example, on a ship), or may be deployed in the air (for example, on an airplane, a balloon, or a satellite). The terminal may be a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a wireless terminal in self driving, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in embodiments of this application. The terminal may also be sometimes referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may be fixed or movable. The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method in this application.

During single-hop transmission (including uplink transmission and downlink transmission) on a Uu link, data may be scrambled by using a scrambling code sequence, and the scrambling code sequence is usually determined based on a C-RNTI of a receive end. In a user cooperation transmission scenario, data arrives at a receive end through two hops. If a data channel is scrambled by using a scrambling code sequence that is determined by using a C-RNTI of the receive end, CUE cannot decode received data, and cannot cooperate with TUE in receiving data, or cannot cooperate with SUE in sending data. For example, in the communication system shown in FIG. 5, the network device 100 needs to send data to the terminal device 202, and may first send the data to the terminal device 201. By using a conventional technology, the network device may scramble the data by using a C-RNTI of the terminal device 202 (a data receive end), and the terminal device 201 receives the data. Because a C-RNTI of the terminal device 201 is different from the C-RNTI of the terminal device 202, the terminal device 201 cannot decode the received data, and cannot forward the data to the terminal device 202. It can be learned that a data scrambling technology in an existing single-hop transmission scenario cannot be directly applied to the user cooperation transmission scenario.

An embodiment of this application provides a data transmission method, applied to a user cooperation transmission scenario. A first terminal device obtains first data from a network device based on a first identifier. The first identifier is used to identify a first cooperation group, and the first cooperation group includes the first terminal device and a second terminal device. The first terminal device may further forward the first data to the second terminal device. When the network device needs to transmit data to the second terminal device, the network device may scramble the data by using an identifier of a cooperation group to which the second terminal device belongs, and then send the data to CUE (the first terminal device). The CUE may descramble the received data based on the identifier of the cooperation group, and therefore forward the data to TUE (the second terminal device). It can be learned that in the method provided in this embodiment of this application, data scrambling transmission in a user cooperation transmission scenario is implemented and data transmission security during user cooperation transmission is improved.

Figure 6A:
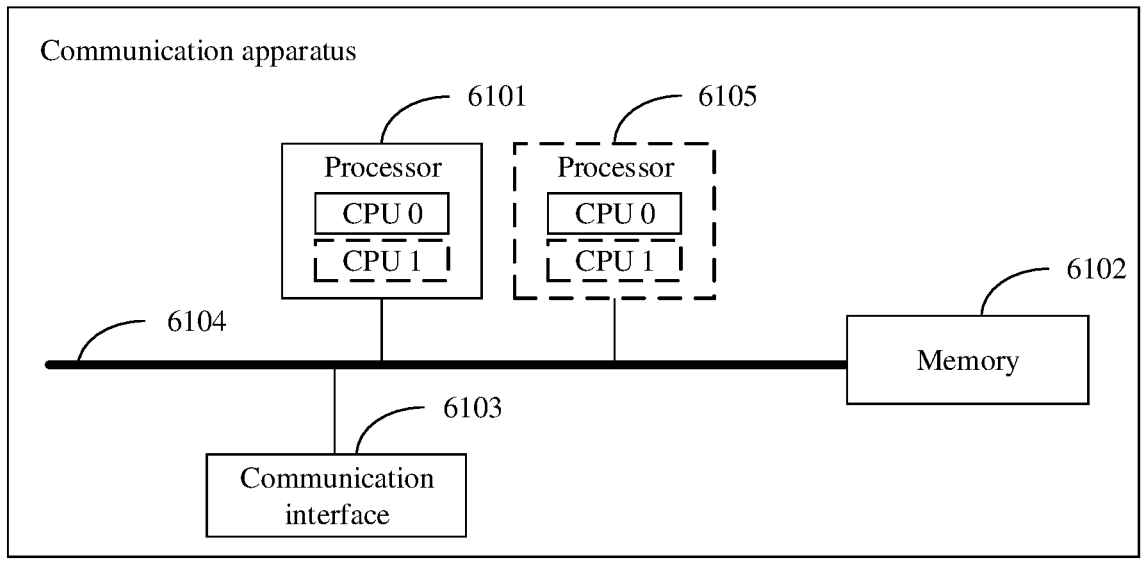
FIG. 6a is a block diagram of a structure of a terminal device according to an embodiment of this application.

The terminal device in this embodiment of this application may be implemented by using a communication apparatus 610 in FIG. 6a. FIG. 6a is a schematic diagram of a hardware structure of a communication apparatus 610 according to an embodiment of this application. The communication apparatus 610 includes a processor 6101, a memory 6102, and at least one communication interface (where FIG. 6a is described merely by using an example in which the communication apparatus includes a communication interface 6103). The processor 6101, the memory 6102, and the communication interface 6103 are connected to each other.

The processor 6101 may be a general-purpose central processing unit (CPU), a microprocessor, an application-specific integrated circuit (ASIC), or one or more integrated circuits for controlling program execution of the solutions of this application.

The communication interface 6103 is configured to communicate with another device or a communication network such as the Ethernet, a radio access network (RAN), or a wireless local area network (WLAN) by using any apparatus such as a transceiver.

The memory 6102 may be a read-only memory (ROM) or another type of static storage device that can store static information and instructions, or a random access memory (RAM) or another type of dynamic storage device that can store information and instructions. The memory 6102 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessed by a computer, but is not limited thereto. The memory may exist independently, and is connected to the processor through a communication line 6102. The memory may alternatively be integrated with the processor.

The memory 6102 is configured to store computer-executable instructions for executing the solutions of this application, and the processor 6101 controls the execution. The processor 6101 is configured to execute the computer-executable instructions stored in the memory 6102, to implement the intent processing method provided in the following embodiments of this application.

Optionally, the computer-executable instructions in this embodiment of this application may also be referred to as application program code. This is not specifically limited in this embodiment of this application.

During specific implementation, in an embodiment, the processor 6101 may include one or more CPUs, for example, a CPU 0 and a CPU 1 in FIG. 6a.

During specific implementation, in an embodiment, the communication apparatus 610 may include a plurality of processors, for example, the processor 6101 and a processor 6106 in FIG. 6a. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 610 may further include an output device 6104 and an input device 6105. The output device 6104 communicates with the processor 6101, and may display information in a plurality of manners. For example, the output device 6104 may be a liquid crystal display (LCD), a light emitting diode (LED) display device, a cathode ray tube (CRT) display device, a projector (projector), or the like. The input device 6105 communicates with the processor 6101, and may receive an input from a user in a plurality of manners. For example, the input device 6105 may be a mouse, a keyboard, a touchscreen device, a sensing device, or the like.

The communication apparatus 610 may be a general-purpose device or a special-purpose device. During specific implementation, the communication apparatus 610 may be a desktop computer, a portable computer, a network server, a palmtop computer (PDA), a mobile phone, a tablet computer, a wireless terminal apparatus, an embedded device, or a device having a structure similar to that in FIG. 6a. A type of the communication apparatus 610 is not limited in this embodiment of this application.

It should be noted that the communication apparatus 610 may be an entire terminal, a component or a part that implements a function of a terminal, or a communication chip, for example, a baseband chip. When the communication apparatus 610 is an entire terminal, the communication interface may be a radio frequency module. When the communication apparatus 610 is a communication chip, the communication interface 6103 may be an input/output interface circuit of the chip, and the input/output interface circuit is configured to read and output a baseband signal.

Figure 6B:
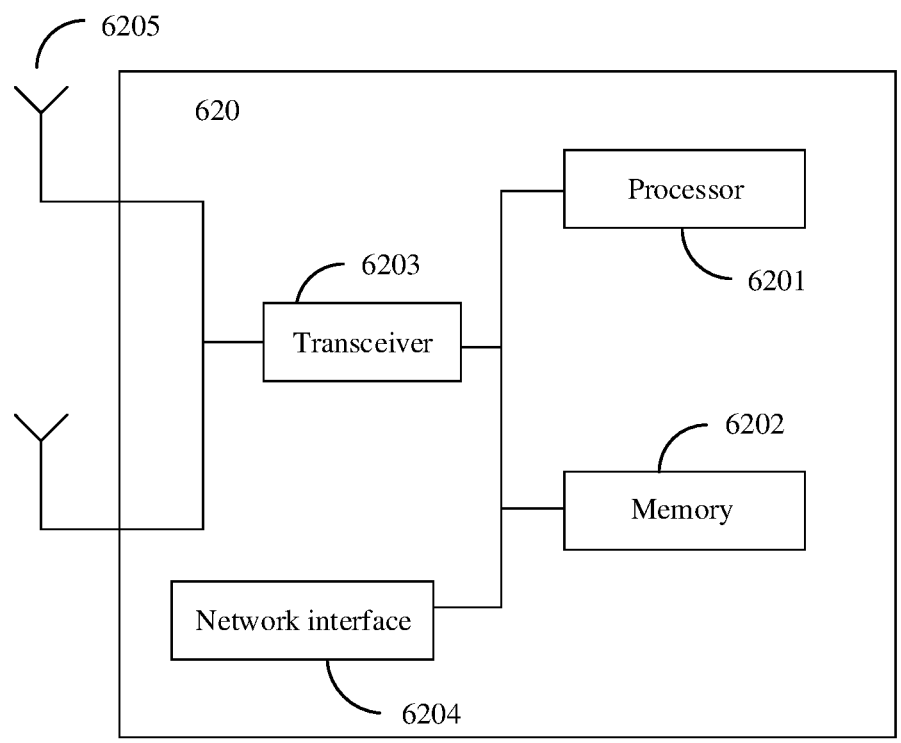
FIG. 6b is a block diagram of a structure of a network device according to an embodiment of this application.

FIG. 6b is a schematic diagram of a structure of a network device. For a structure of a network device 62o, refer to the structure shown in FIG. 6b.

The network device includes at least one processor 6201, at least one memory 6202, at least one transceiver 6203, at least one network interface 6204, and one or more antennas 6205. The processor 6201, the memory 6202, the transceiver 6203, and the network interface 6204 are connected through, for example, a bus. The antenna 6205 is connected to the transceiver 6203. The network interface 6204 is configured to enable the network device to be connected to another communication device through a communication link. For example, the network device is connected to a core network element through an Si interface. In this embodiment of this application, the connection may include various types of interfaces, transmission lines, buses, or the like. This is not limited in this embodiment.

In this embodiment of this application, the processor such as the processor 6201 may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 6201 may be a single-core (single-CPU) processor or a multi-core (multi-CPU) processor. The at least one processor 6201 may be integrated into one chip or located on a plurality of different chips.

In this embodiment of this application, the memory such as the memory 6202 may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto.

The memory 6202 may exist independently, and is connected to the processor 6201. Optionally, the memory 6202 and the processor 6201 may alternatively be integrated together, for example, integrated into a chip. The memory 6202 can store program code for executing the technical solutions in embodiments of this application, and the processor 6201 controls the execution. Various types of executed computer program code may also be considered as drivers of the processor 6201. For example, the processor 6201 is configured to execute the computer program code stored in the memory 6202, to implement the technical solutions in embodiments of this application.

The transceiver 6203 may be configured to support receiving or sending of a radio frequency signal between the network device and a terminal device, and the transceiver 6203 may be connected to the antenna 6205. Specifically, the one or more antennas 6205 may receive a radio frequency signal. The transceiver 6203 may be configured to: receive the radio frequency signal from the antennas, convert the radio frequency signal into a digital baseband signal or a digital intermediate frequency signal, and provide the digital baseband signal or the digital intermediate frequency signal for the processor 6201, so that the processor 6201 further processes the digital baseband signal or the digital intermediate frequency signal, for example, performs demodulation processing and decoding processing. In addition, the transceiver 6203 may be configured to: receive a modulated digital baseband signal or digital intermediate frequency signal from the processor 6201, convert the modulated digital baseband signal or digital intermediate frequency signal into a radio frequency signal, and send the radio frequency signal through the one or more antennas 6205. Specifically, the transceiver 6203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 6203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. The transceiver may be referred to as a transceiver circuit, a transceiver unit, a transceiver component, a sending circuit, a sending unit, a sending component, or the like.

It should be noted that the communication apparatus 620 may be an entire network device, a component or a part that implements a function of a network device, or a communication chip. When the communication apparatus 620 is a communication chip, the transceiver 6203 may be an interface circuit of the chip, and the interface circuit is configured to read and output a baseband signal.

Figure 7:
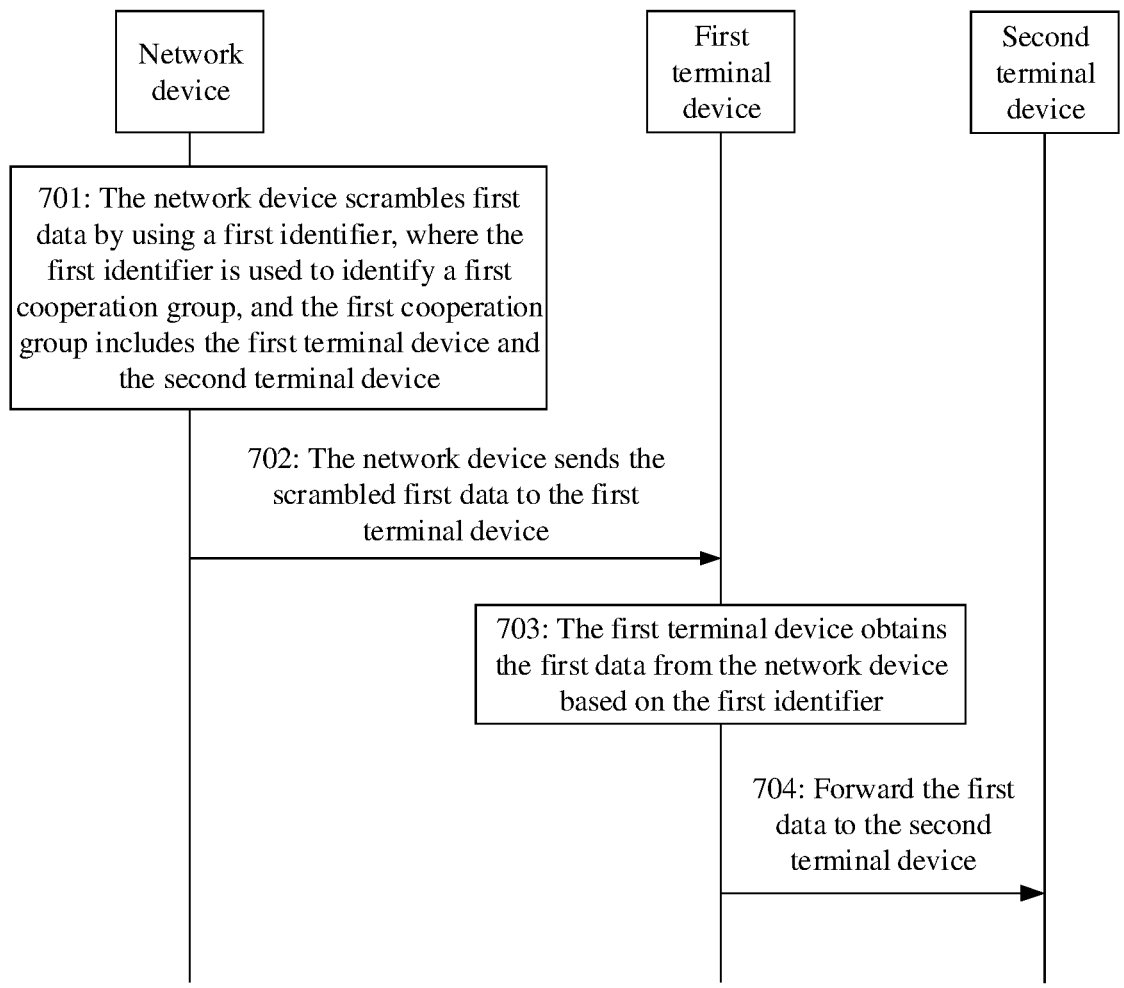
FIG. 7 is a schematic flowchart of a data transmission method according to an embodiment of this application.

An embodiment of this application provides a data transmission method, applied to a downlink user cooperation transmission scenario. As shown in FIG. 7, the method includes the following steps.

701: A network device scrambles first data by using a first identifier, where the first identifier is used to identify a first cooperation group, and the first cooperation group includes a first terminal device and a second terminal device.

The first terminal device and the second terminal device belong to a same user cooperation group, for example, the first cooperation group described in this embodiment of this application. In addition, the first terminal device is CUE, and is configured to cooperate with the network device in transmitting data to the second terminal device. The second terminal device is TUE, and is a final receive end of the data sent by the network device, that is, the data sent by the network device is terminated on the second terminal device.

When the network device needs to send data to the TUE, the network device may first send the data to the CUE. After receiving the data from the network device, the CUE sends the data to the TUE. To ensure data security and improve transmission reliability, the network device may scramble the sent data. For example, the first data is data that needs to be sent by the network device to the second terminal device. The first terminal device may cooperate with the network device in sending the first data to the second terminal device. The network device may scramble the first data by using an identifier (for example, the first identifier) of the user cooperation group to which the first terminal device and the second terminal device belong.

Specifically, there are two possible implementations of the first identifier. Details are described below.

Implementation 1: The first identifier may be a UC-RNTI, and is used to identify the first cooperation group. The UC-RNTI is a type of RNTI, but is different from a C-RNTI. For example, the first identifier is different from a C-RNTI of the first terminal device, and is also different from a C-RNTI of the second terminal device.

Implementation 2: The first identifier includes a first sub-identifier and a second sub-identifier. The first sub-identifier is a UC-RNTI, and the first sub-identifier is different from a C-RNTI of the first terminal device, and is different from a C-RNTI of the second terminal device.

The second sub-identifier may be an integer that is greater than or equal to 0 and less than or equal to 31, and may be converted into a binary sequence of 1 bit to 5 bits, in other words, a length of the binary sequence of the second sub-identifier is 1 bit to 5 bits.

During specific implementation, the network device may directly determine a scrambling code sequence based on a binary sequence of the first identifier, and then scramble the first data by using the scrambling code sequence. For example, the network device may determine an initial sequence of the scrambling code sequence, that is, a binary sequence of an initial value $c_{init}$ of the scrambling code sequence, based on the binary sequence of the first identifier, and the network device may further determine, based on the initial sequence, the scrambling code sequence used to finally scramble to-be-sent data (for example, the first data). The initial sequence is a binary sequence with a length of 31 bits.

Alternatively, the network device may determine an initial value $c_{init}$ of the scrambling code sequence based on the first identifier, convert the initial value $c_{init}$ of the scrambling code sequence into a binary sequence to obtain the initial sequence, and then determine the scrambling code sequence based on the initial sequence.

In addition, the network device selects different first identifiers, and accordingly, initial sequences determined based on the first identifiers are also different. For example, in correspondence to the two implementations of the first identifier, the network device may also determine the following two different initial sequences.

Figure 8:
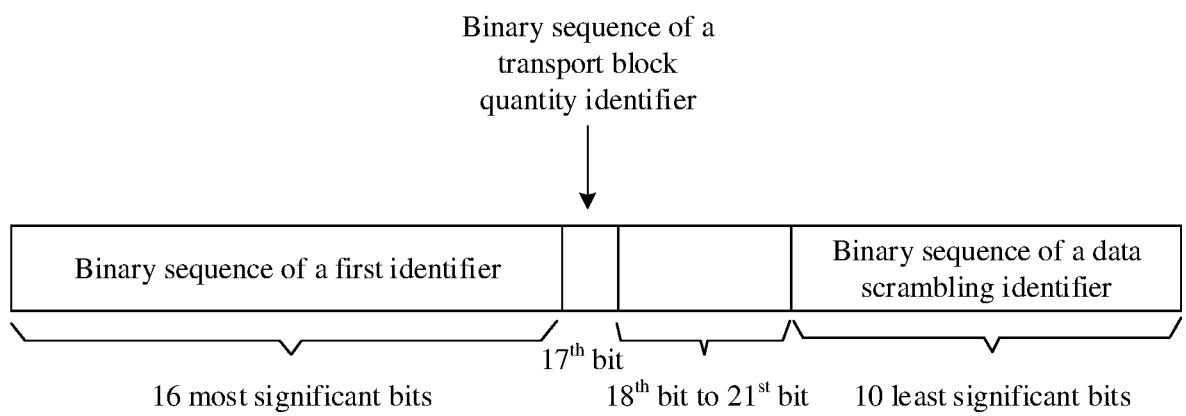
FIG. 8 to FIG. 11 each are a schematic diagram of a scrambling code sequence according to an embodiment of this application.

In a first case, corresponding to the implementation 1 of the first identifier, in a downlink user cooperation transmission scenario, the network device may determine the initial sequence shown in FIG. 8 based on the binary sequence of the first identifier. Refer to FIG. 8. 16 most significant bits of the initial sequence are the binary sequence of the first identifier, the 17$^{th}$ bit of the initial sequence is a binary sequence of a transport block quantity identifier, and 10 least significant bits of the initial sequence are a binary sequence of a data scrambling identifier. In the implementation shown in FIG. 8, the 18$^{th}$ bit to the 21$^{st}$ bit of the initial scrambling code sequence may be set to zero or padded with another binary sequence. This is not limited in this embodiment of this application.

The transport block quantity identifier q is used to indicate a transport block (TB) included in the to-be-sent data of the network device. For example, the transport block quantity identifier may indicate a quantity of transport blocks included in the first data. For example, the transport block data identifier is 0 or 1. When the transport block identifier is 0, it may indicate that the to-be-sent data of the network device includes one TB. When the transport block identifier is 1, it may indicate that the to-be-sent data of the network device includes two TBs.

In addition, the data scrambling identifier $n_{ID}$ is a higher layer parameter configured by the network device, a value of the higher layer parameter is [0, 1, . . . , 1023], and the data scrambling identifier may be converted into a 10-bit binary sequence. The data scrambling identifier may alternatively be a physical layer cell identifier $n_{ID}^{cell}$.

It should be noted that, if the data scrambling identifier $n_{ID}$ is a higher layer parameter dataScramblingIdentityPDSCH, the following conditions further need to be met: an RNTI is equal to a C-RNTI, a modulation and coding scheme (MCS) MCS-C-RNTI, or a CS-RNTI, and the network device does not schedule a terminal device in common search space by using a DCI format 1_0.

In this implementation, the initial value $c_{init}$ of the scrambling code sequence satisfies the following formula (1):

$$c_{init}=n_1 g 2^{15}+qg2^{14}+n_{ID} \tag{1}$$

$n_1$ is the first identifier. Optionally, the network device may substitute the first identifier, the transport block quantity identifier q, and the data scrambling identifier $n_{ID}$ into the foregoing formula (1) to determine the initial value $c_{init}$ of the scrambling code sequence, convert the initial value $c_{init}$ of the scrambling code sequence into a binary sequence to obtain the initial sequence shown in FIG. 8, and then determine the scrambling code sequence based on the initial sequence.

Figure 9:
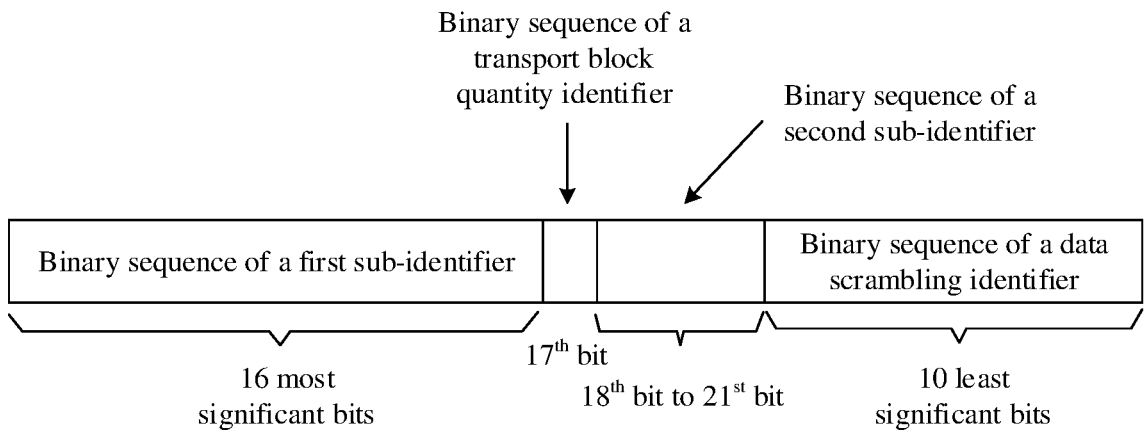

In a second case, corresponding to the implementation 1 of the first identifier, in a downlink user cooperation transmission scenario, the network device may determine the initial sequence shown in FIG. 9 based on the binary sequence of the first identifier. Refer to FIG. 9. 16 most significant bits of the initial sequence are a binary sequence of the first sub-identifier, the 17$^{th}$ bit of the initial sequence is a binary sequence of a transport block quantity identifier, at least one of the 18$^{th}$ bit to the 21$^{st}$ bit of the scrambling code sequence is a binary sequence of the second sub-identifier, and 10 least significant bits of the initial sequence are a binary sequence of a data scrambling identifier. In other words, the 18$^{th}$ bit to the 21$^{st}$ bit of the initial scrambling code sequence may be used to pad the binary sequence of the second sub-identifier, and a length of the binary sequence of the second sub-identifier is 1 bit to 4 bits.

In addition, for related explanations of the transport block quantity identifier q and the data scrambling identifier $n_{ID}$, refer to the foregoing descriptions. Details are not described herein again.

In this implementation, the initial value $c_{init}$ of the scrambling code sequence satisfies the following formula (2):

$$c_{init}=n_{11} g 2^{15}+qg2^{14}+n_{12}g2^y+n_{ID} \tag{2}$$

$n_{11}$ is the first sub-identifier, and $n_{12}$ is the second sub-identifier. Optionally, the network device may substitute the first sub-identifier, the second sub-identifier, the transport block quantity identifier q, and the data scrambling identifier $n_{ID}$ into the foregoing formula (2) to determine the initial value $c_{init}$ of the scrambling code sequence, convert the initial value $c_{init}$ of the scrambling code sequence into a binary sequence to obtain the initial sequence shown in FIG. 9, and then determine the scrambling code sequence based on the initial sequence.

It should be noted that a length of the second sub-identifier is x bits, and x is an integer that is greater than or equal to 1 and is less than or equal to 4. In addition, a relationship between a value of x and a value of y satisfies the following Table 1.

TABLE 1

| Value of x | Value of y |
|---|---|
| 1 | 10, 11, 12, or 13 |
| 2 | 10, 11, or 12 |
| 3 | 10 or 11 |
| 4 | 10 |

702: The network device sends the scrambled first data to the first terminal device.

Specifically, the network device constructs a data packet based on the scrambled first data, and sends the constructed data packet to the first terminal device through a PDSCH.

703: The first terminal device obtains the first data from the network device based on the first identifier.

Specifically, after receiving the data packet from the network device, the first terminal device may further determine the scrambling code sequence based on the first identifier, and then may descramble, based on the determined scrambling code, the data packet received from the network device.

For example, the first terminal device may determine the initial sequence of the scrambling code sequence based on the binary sequence of the first identifier, may further determine the scrambling code sequence based on the initial sequence of the scrambling code sequence, and descramble, by using the scrambling code sequence, the data packet received from the network device.

Alternatively, the network device may determine the initial value $c_{init}$ of the scrambling code sequence based on the first identifier, convert the initial value $c_{init}$ of the scrambling code sequence into a binary sequence to obtain the initial sequence, determine the scrambling code sequence based on the initial sequence, and descramble, by using the scrambling code sequence, the data packet received from the network device.

Similarly, in correspondence to the two implementations of the first identifier, the first terminal device may also determine two different initial sequences.

Specifically, corresponding to the implementation 1 of the first identifier, the first terminal device may determine the initial sequence shown in FIG. 8 based on the binary sequence of the first identifier. Alternatively, the first terminal device may substitute the first identifier, the transport block quantity identifier q, and the data scrambling identifier $n_{ID}$ into the foregoing formula (i) to determine the initial value $c_{init}$ of the scrambling code sequence, convert the initial value $c_{init}$ of the scrambling code sequence into a binary sequence to obtain the initial sequence shown in FIG. 8, and then determine the scrambling code sequence based on the initial sequence.

In addition, corresponding to the implementation 2 of the first identifier, the first terminal device may determine the initial sequence shown in FIG. 9 based on the binary sequence of the first sub-identifier and the binary sequence of the second sub-identifier. Alternatively, the first terminal device may substitute the first sub-identifier, the second sub-identifier, the transport block quantity identifier q, and the data scrambling identifier $n_{ID}$ into the foregoing formula (2) to determine the initial value $c_{init}$ of the scrambling code sequence, convert the initial value $c_{init}$ of the scrambling code sequence into a binary sequence to obtain the initial sequence shown in FIG. 9, and then determine the scrambling code sequence based on the initial sequence.

704: The first terminal device forwards the first data to the second terminal device.

Specifically, the first terminal device may construct a data packet based on the first data obtained in step 703, and send the constructed data packet to the second terminal device through a physical sidelink data channel (PSSCH). The second terminal device may receive the data packet from the first terminal, and obtain the first data from the data packet, to complete downlink user cooperation transmission.

Optionally, the method shown in FIG. 7 further includes: The network device sends the first identifier to the first terminal device and the second terminal device. The first terminal device receives the first identifier from the network device, and the first terminal device may descramble, based on the first identifier, the data packet received from the network device, and obtain the first data from the data packet. The first terminal device may further scramble the first data based on the first identifier, and send the scrambled first data to the second terminal device.

The second terminal device may receive the first identifier from the network device, descramble, based on the first identifier, the data packet received from the first terminal device, and obtain the first data from the data packet.

Optionally, the network device may further send a second identifier to the first terminal device and the second terminal device. The network device may scramble the first data based on the first identifier and the second identifier, and send the scrambled data to the first terminal device. Specifically, the network device determines a scrambling code sequence based on the first identifier and the second identifier, and then scrambles the first data by using the scrambling code sequence. For example, the network device may determine an initial sequence of the scrambling code sequence, that is, a binary sequence of an initial value $c_{init}$ of the scrambling code sequence, based on the binary sequence of the first identifier and a binary sequence of the second identifier, and the network device may further determine, based on the initial sequence, the scrambling code sequence used to finally scramble to-be-sent data (for example, the first data). The initial sequence is a binary sequence with a length of 31 bits.

Alternatively, the network device may determine an initial value $c_{init}$ of the scrambling code sequence based on the first identifier and the second identifier, convert the initial value $c_{init}$ of the scrambling code sequence into a binary sequence to obtain the initial sequence, determine the scrambling code sequence based on the initial sequence, and scramble the first data by using the scrambling code sequence.

In addition, the network device selects different first identifiers, and accordingly, initial sequences determined based on the first identifiers and the second identifier are also different. For example, in correspondence to the two implementations of the first identifier, the network device may determine the following two different initial sequences based on the first identifier and the second identifier.

Figure 10:
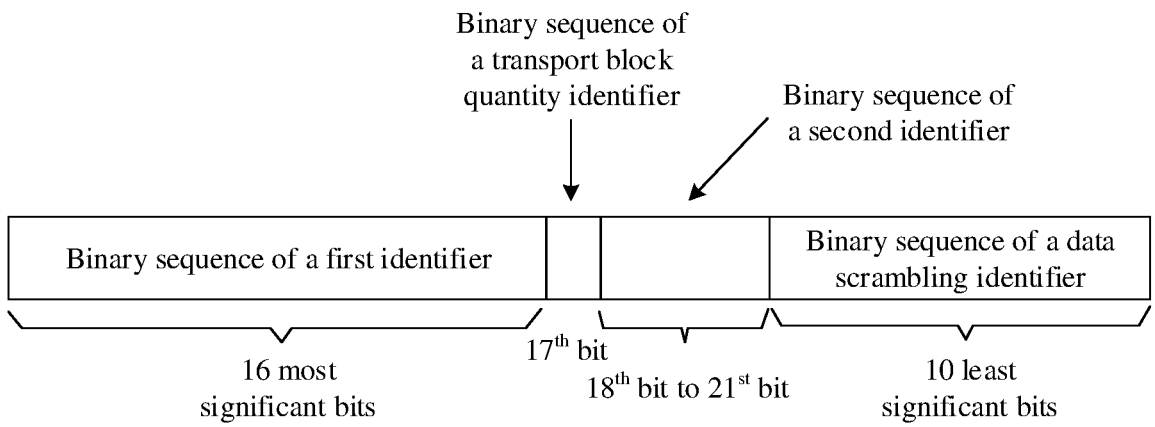

In a first case, corresponding to the implementation 1 of the first identifier, in a downlink user cooperation transmission scenario, the network device may determine the initial sequence shown in FIG. 10 based on the binary sequence of the first identifier and the binary sequence of the second identifier. Refer to FIG. 10. 16 most significant bits of the initial sequence are the binary sequence of the first identifier, the 17$^{th}$ bit of the initial sequence is a binary sequence of a transport block quantity identifier, and 10 least significant bits of the initial sequence are a binary sequence of a data scrambling identifier. At least one of the 18$^{th}$ bit to the 21$^{st}$ bit of the initial scrambling code sequence is the binary sequence of the second identifier.

In addition, for related explanations of the transport block quantity identifier q and the data scrambling identifier $n_{ID}$, refer to the foregoing descriptions. Details are not described herein again.

In this implementation, the initial value $c_{init}$ of the scrambling code sequence satisfies the following formula (3):

$$c_{init}=n_1 g 2^{15}+qg2^{14}+n_2 g 2^r+n_{ID} \qquad (3)$$

$n_1$ is the first identifier, and $n_2$ is the second identifier. Optionally, the network device may substitute the first identifier $n_1$, the second identifier $n_2$, the transport block quantity identifier q, and the data scrambling identifier $n_{ID}$ into the foregoing formula (3) to determine the initial value $c_{init}$ of the scrambling code sequence, convert the initial value $c_{init}$ of the scrambling code sequence into a binary sequence to obtain the initial sequence shown in FIG. 10, and then determine the scrambling code sequence based on the initial sequence.

It should be noted that a length of the second identifier $n_2$ is s bits, and s is an integer that is greater than or equal to 1 and is less than or equal to 4. In addition, a relationship between a value of s and a value of t satisfies the following Table 2.

TABLE 2

| Value of s | Value of t |
| --- | --- |
| 1 | 10, 11, 12, or 13 |
| 2 | 10, 11, or 12 |
| 3 | 10 or 11 |
| 4 | 10 |

Correspondingly, the first terminal device may determine the initial sequence shown in FIG. to based on the binary sequence of the first identifier and the binary sequence of the second identifier. Alternatively, the first terminal device may substitute the first identifier, the second identifier, the transport block quantity identifier q, and the data scrambling identifier $n_{ID}$ into the foregoing formula (3) to determine the initial value $c_{init}$ of the scrambling code sequence, convert the initial value $c_{init}$ of the scrambling code sequence into a binary sequence to obtain the initial sequence shown in FIG. 10, and then determine the scrambling code sequence based on the initial sequence.

Figure 11:
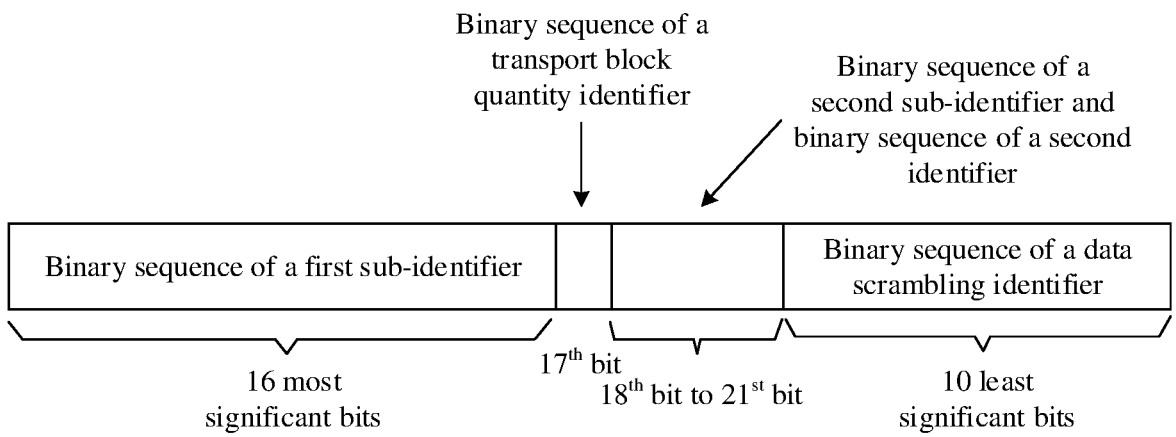

In a second case, corresponding to the implementation 2 of the first identifier, in a downlink user cooperation transmission scenario, the network device may determine the initial sequence shown in FIG. 11 based on the binary sequence of the first identifier. Refer to FIG. 11. 16 most significant bits of the initial sequence are a binary sequence of the first sub-identifier, the $17^{th}$ bit of the initial sequence is a binary sequence of a transport block quantity identifier, a binary sequence of the second sub-identifier and a binary sequence of the second identifier jointly occupy the $18^{th}$ bit to the $21^{st}$ bit of the scrambling code sequence, and 10 least significant bits of the initial sequence are a binary sequence of a data scrambling identifier. In other words, the $18^{th}$ bit to the $21^{st}$ bit of the initial scrambling code sequence may be used to pad the binary sequence of the second sub-identifier and the binary sequence of the second identifier. It is assumed that a length of the binary sequence of the second sub-identifier is x, a length of the binary sequence of the second identifier is s, and (x+s) is an integer that is greater than or equal to 2 and is less than or equal to 4.

In addition, for related explanations of the transport block quantity identifier q and the data scrambling identifier $n_{ID}$, refer to the foregoing descriptions. Details are not described herein again.

In this implementation, the initial value $c_{init}$ of the scrambling code sequence satisfies the following formula (4):

$$c_{init} = n_{11}g2^{15} + qg2^{14} + n_{12}g2^y + n_2g2^t + n_{ID} \quad (4)$$

$n_{11}$ is the first sub-identifier, $n_{12}$ is the second sub-identifier, and $n_2$ is the second identifier. Optionally, the network device may substitute the first sub-identifier $n_{11}$, the second sub-identifier $n_{12}$, the second identifier $n_2$, the transport block quantity identifier q, and the data scrambling identifier $n_{ID}$ into the foregoing formula (4) to determine the initial value $c_{init}$ of the scrambling code sequence, convert the initial value $c_{init}$ of the scrambling code sequence into a binary sequence to obtain the initial sequence shown in FIG. 11, and then determine the scrambling code sequence based on the initial sequence.

It should be noted that a length of the second identifier $n_2$ is s bits, a length of the second sub-identifier is x, and (x+s) is an integer that is greater than or equal to 2 and is less than or equal to 4. In addition, a relationship between a value of x and a value of y satisfies the foregoing Table 1, and a relationship between a value of s and a value oft satisfies the foregoing Table 2.

Correspondingly, the first terminal device may determine the initial sequence shown in FIG. 11 based on the binary sequence of the first sub-identifier, the binary sequence of the second sub-identifier, and the binary sequence of the second identifier. Alternatively, the first terminal device may substitute the first sub-identifier, the second sub-identifier, the second identifier, the transport block quantity identifier q, and the data scrambling identifier $n_{ID}$ into the foregoing formula (2) to determine the initial value $c_{init}$ of the scrambling code sequence, convert the initial value $c_{init}$ of the scrambling code sequence into a binary sequence to obtain the initial sequence shown in FIG. 11, and then determine the scrambling code sequence based on the initial sequence.

Optionally, the method shown in FIG. 7 further includes: The network device sends control information to the first terminal device, where the control information indicates the first terminal device to forward the first data to the second terminal device. It may be understood that, in the downlink user cooperation transmission scenario, the network device may send downlink control information (DCI) to the first terminal device to indicate the first terminal device to cooperate with the network device in sending data to the second terminal device, that is, the first terminal device forwards the data to the second terminal device after receiving the data from the network device.

For example, the network device may further explicitly indicate the first terminal device to perform cooperation transmission. For example, a i-bit indication field is added to the DCI. The indication field is padded with a "first value", indicating that the first terminal device cooperates with the network device in sending the data to the second terminal device, and the first data is terminated on the second terminal device. The indication field is padded with a "second value", indicating that the first terminal device does not need to cooperate with the network device in sending the data to the second terminal device, and the first data is terminated on the first terminal device. Optionally, the first value is "1", and the second value is "0".

For example, the network device may further implicitly indicate the first terminal device to perform cooperation transmission. For example, the network device scrambles the DCI by using the first identifier, and the first terminal device descrambles a downlink control channel (PDCCH) by using the first identifier. Successful descrambling of the PDCCH indicates that the first terminal device needs to perform cooperation transmission. Conversely, if the first terminal device fails to descramble the PDCCH by using the first identifier, the first terminal device does not need to cooperate with the network device in sending the data to the second terminal device.

Optionally, the first identifier may be further used to identify the second terminal device, and is different from the C-RNTI of the second terminal device. The network device may configure an identifier (for example, the first identifier) of the second terminal device for the first terminal device. The network device may scramble the first data based on the identifier of the second terminal device. The first terminal device may descramble, based on the identifier of the second terminal device, the data packet received from the network device, and obtain the first data from the data packet. Therefore, the first terminal device sends the first data to the second terminal device, to complete cooperation transmission.

In this embodiment of this application, when the network device needs to transmit the data to the second terminal device, the network device may scramble the data by using the identifier of the cooperation group to which the second terminal device belongs, and then send the data to CUE in the cooperation group, for example, the first terminal device. The first terminal device may descramble the received data based on the identifier of the cooperation group, so that the first terminal device may forward the data to the second terminal device. It can be learned that, in the method provided in this embodiment of this application, on the premise that existing single-hop data transmission on the Uu link is not affected, data scrambling transmission during user cooperation transmission is implemented and data transmission security during user cooperation transmission is improved.

Figure 12:
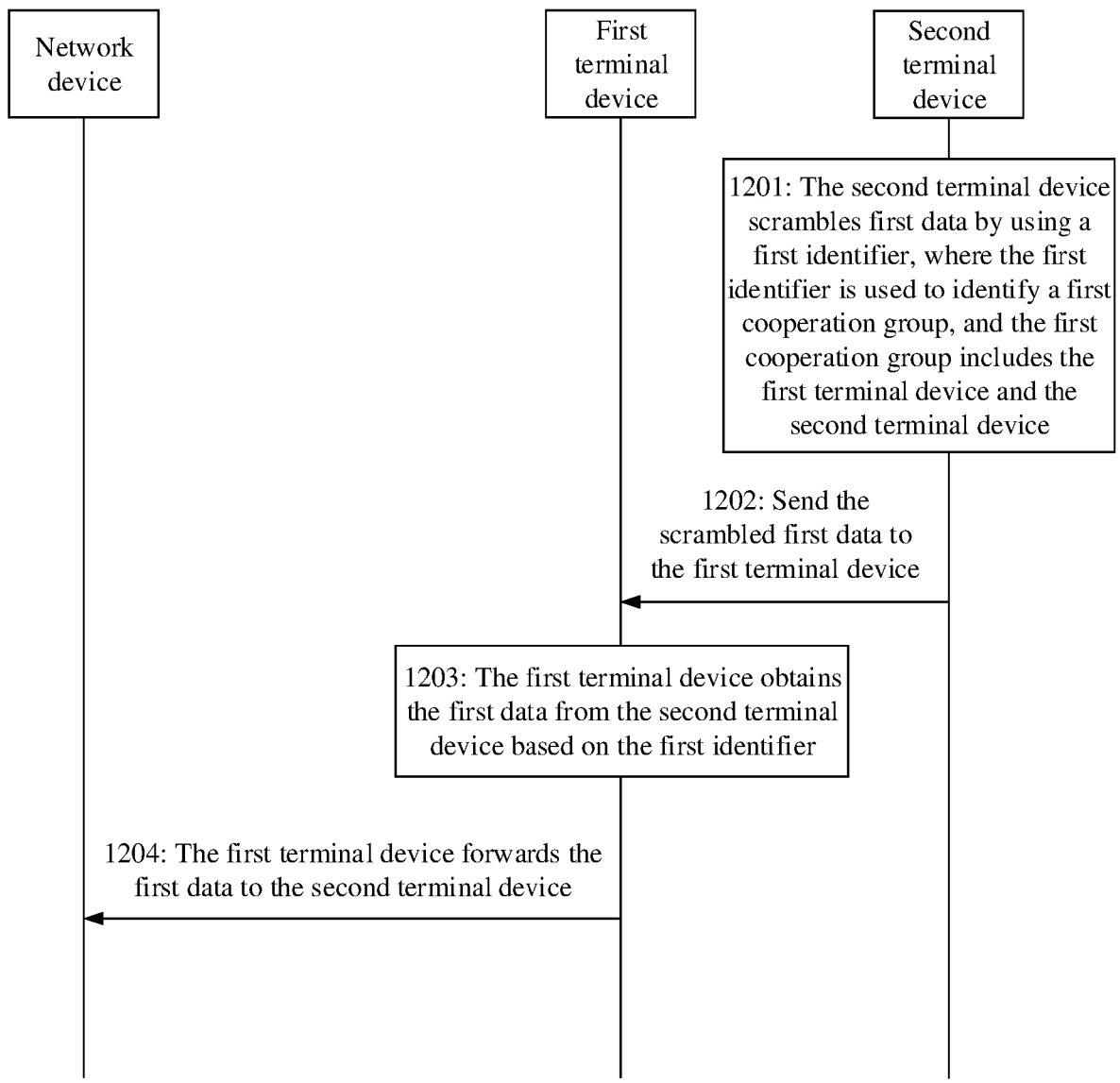
FIG. 12 to FIG. 16 each are another schematic diagram of a data transmission method according to an embodiment of this application.

An embodiment of this application provides a data transmission method, applied to uplink user cooperation transmission. As shown in FIG. 12, the method includes the following steps.

1201: A second terminal device scrambles first data by using a first identifier, where the first identifier is used to identify a first cooperation group, and the first cooperation group includes a first terminal device and the second terminal device.

The first terminal device and the second terminal device belong to a same user cooperation group, for example, the first cooperation group described in this embodiment of this application. In addition, the second terminal device is SUE, the first terminal device is CUE, and the first terminal device may cooperate with the second terminal device in transmitting data to a network device. The network device is a final receive end of the data sent by the second terminal device, that is, the data sent by the second terminal device is terminated on the network device.

When the SUE needs to send data to the network device, the SUE may first send the data to the CUE. After receiving the data from the SUE, the CUE sends the data to the network device. To ensure data security and improve transmission reliability, the SUE may scramble the sent data. For example, the first data is data that needs to be sent by the second terminal device to the network device. The first terminal device may cooperate with the second terminal device in sending the first data to the network device. The second terminal device may scramble the first data by using an identifier (for example, the first identifier) of the user cooperation group to which the first terminal device and the second terminal device belong.

Specifically, there are two possible implementations of the first identifier. Refer to related descriptions in step 701. Details are not described herein again.

During specific implementation, the second terminal device may directly determine a scrambling code sequence based on a binary sequence of the first identifier, and then scramble the first data by using the scrambling code sequence. For example, the second terminal device may determine an initial sequence of the scrambling code sequence, that is, a binary sequence of an initial value $c_{init}$ of the scrambling code sequence, based on the binary sequence of the first identifier, and the network device may further determine, based on the initial sequence, the scrambling code sequence used to finally scramble to-be-sent data (for example, the first data). The initial sequence is a binary sequence with a length of 31 bits.

Alternatively, the second terminal device may determine an initial value $c_{init}$ of the scrambling code sequence based on the first identifier, convert the initial value $c_{init}$ of the scrambling code sequence into a binary sequence to obtain the initial sequence, and then determine the scrambling code sequence based on the initial sequence.

In addition, the second terminal device selects different first identifiers, and accordingly, initial sequences determined based on the first identifiers are also different. For example, in correspondence to the two implementations of the first identifier, the second terminal device may also determine the following two different initial sequences.

Figure 13:
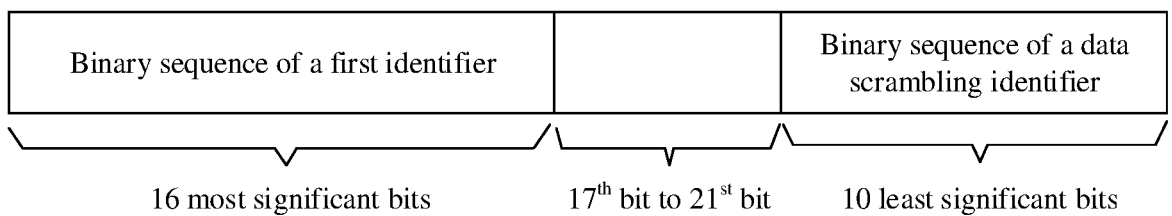

In a first case, corresponding to the implementation 1 of the first identifier, in an uplink user cooperation transmission scenario, the second terminal device may determine the initial sequence shown in FIG. 13 based on the binary sequence of the first identifier. Refer to FIG. 13. 16 most significant bits of the initial sequence are the binary sequence of the first identifier, and 10 least significant bits of the initial sequence are a binary sequence of a data scrambling identifier. The $17^{th}$ bit to the $21^{st}$ bit of the initial scrambling code sequence may be set to zero or padded with another binary sequence. This is not limited in this embodiment of this application.

The data scrambling identifier $n_{ID}$ is a higher layer parameter configured by the network device, a value of the higher layer parameter is [0, 1, . . . , 1023], and the data scrambling identifier may be converted into a 10-bit binary sequence. The data scrambling identifier may alternatively be a physical layer cell identifier $n_{ID}^{cell}$.

It should be noted that, if the data scrambling identifier $n_{ID}$ is a higher layer parameter dataScramblingIdentityPDSCH, the following conditions further need to be met: an RNTI is equal to a C-RNTI, a modulation and coding scheme (MCS) MCS-C-RNTI, or a CS-RNTI, and the network device does not schedule a terminal device in common search space by using a DCI format 1_0.

In this implementation, the initial value $c_{init}$ of the scrambling code sequence satisfies the following formula (5):

$$c_{init}=n_1 g 2^{15}+n_{ID} \qquad (5)$$

$n_1$ is the first identifier. Optionally, the network device may substitute the first identifier and the data scrambling identifier $n_{ID}$ into the foregoing formula (5) to determine the initial value $c_{init}$ of the scrambling code sequence, convert the initial value $c_{init}$ of the scrambling code sequence into a binary sequence to obtain the initial sequence shown in FIG. 13, and then determine the scrambling code sequence based on the initial sequence.

Figure 14:
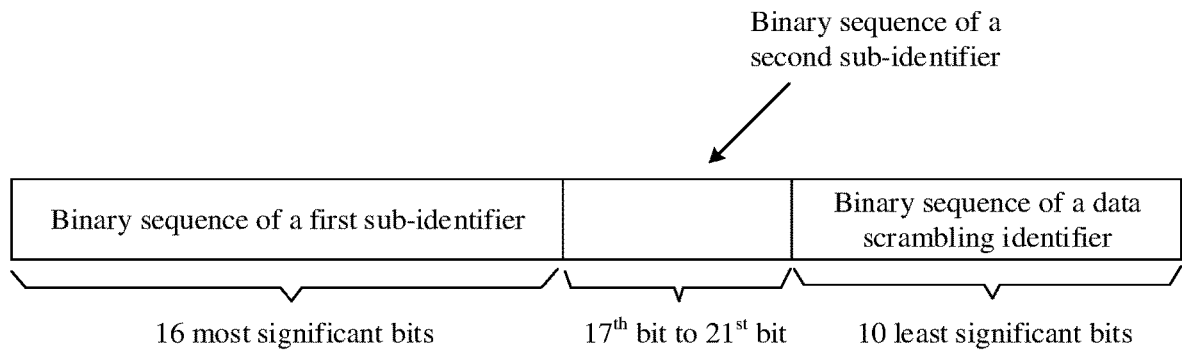

In a second case, corresponding to the implementation 1 of a second identifier, in an uplink user cooperation transmission scenario, the second terminal device may determine the initial sequence shown in FIG. 14 based on the binary sequence of the first identifier. Refer to FIG. 14. 16 most significant bits of the initial sequence are a binary sequence of a first sub-identifier, at least one of the $17^{th}$ bit to the $21^{st}$ bit of the scrambling code sequence is a binary sequence of a second sub-identifier, and 10 least significant bits of the initial sequence are a binary sequence of a data scrambling identifier. In other words, the $17^{th}$ bit to the $21^{st}$ bit of the initial scrambling code sequence may be used to pad the binary sequence of the second sub-identifier, and a length of the binary sequence of the second sub-identifier is 1 bit to 5 bits.

In addition, for related explanations of the data scrambling identifier $n_{ID}$, refer to the foregoing descriptions. Details are not described herein again.

In this implementation, the initial value $c_{init}$ of the scrambling code sequence satisfies the following formula (6):

$$c_{init}=n_{11} g 2^{15}+n_{12} g 2^y + n_{ID} \qquad (6)$$

$n_{11}$ is the first sub-identifier, and $n_{12}$ is the second sub-identifier. Optionally, the network device may substitute the first sub-identifier, the second sub-identifier, and the data scrambling identifier $n_{ID}$ into the foregoing formula (6) to determine the initial value $c_{init}$ of the scrambling code sequence, convert the initial value $c_{init}$ of the scrambling code sequence into a binary sequence to obtain the initial sequence shown in FIG. 14, and then determine the scrambling code sequence based on the initial sequence.

It should be noted that a length of the second sub-identifier $n_{12}$ is x bits, and x is an integer that is greater than or equal to 1 and is less than or equal to 5. In addition, a relationship between a value of x and a value of y satisfies the following Table 3.

TABLE 3

| Value of x | Value of y |
| --- | --- |
| 1 | 10, 11, 12, 13, or 14 |
| 2 | 10, 11, 12, or 13 |
| 3 | 10, 11, or 12 |
| 4 | 10 or 11 |
| 5 | 10 |

Specifically, the second terminal device constructs a data packet based on the scrambled first data, and sends the constructed data packet to the network device through a PSSCH.

1202: The second terminal device sends the scrambled first data to the first terminal device.

Specifically, after receiving the data packet from the network device, the first terminal device may further determine the scrambling code sequence based on the first identifier, and then may descramble, based on the determined scrambling code, the data packet received from the network device.

1203: The first terminal device obtains the first data from the second terminal device based on the first identifier.

For example, the first terminal device may determine the initial sequence of the scrambling code sequence based on the binary sequence of the first identifier, may further determine the scrambling code sequence based on the initial sequence of the scrambling code sequence, and descramble, by using the scrambling code sequence, the data packet received from the network device.

Alternatively, the network device may determine the initial value $c_{init}$ of the scrambling code sequence based on the first identifier, convert the initial value $c_{init}$ of the scrambling code sequence into a binary sequence to obtain the initial sequence, determine the scrambling code sequence based on the initial sequence, and descramble, by using the scrambling code sequence, the data packet received from the network device.

Similarly, in correspondence to the two implementations of the first identifier, the first terminal device may also determine two different initial sequences.

Specifically, corresponding to the implementation 1 of the first identifier, the first terminal device may determine the initial sequence shown in FIG. 13 based on the binary sequence of the first identifier. Alternatively, the first terminal device may substitute the first identifier and the data scrambling identifier $n_{ID}$ into the foregoing formula (5) to determine the initial value $c_{init}$ of the scrambling code sequence, convert the initial value $c_{init}$ of the scrambling code sequence into a binary sequence to obtain the initial sequence shown in FIG. 13, and then determine the scrambling code sequence based on the initial sequence.

In addition, corresponding to the implementation 2 of the first identifier, the first terminal device may determine the initial sequence shown in FIG. 14 based on the binary sequence of the first identifier. Alternatively, the first terminal device may substitute the first sub-identifier, the second sub-identifier, and the data scrambling identifier $n_{ID}$ into the foregoing formula (6) to determine the initial value $c_{init}$ of the scrambling code sequence, convert the initial value $c_{init}$ of the scrambling code sequence into a binary sequence to obtain the initial sequence shown in FIG. 14, and then determine the scrambling code sequence based on the initial sequence.

1204: The first terminal device forwards the first data to the second terminal device.

Specifically, the first terminal device may construct a data packet based on the first data obtained in step 1203, and send the constructed data packet to the network device through a physical uplink data channel (PUSCH). The network device may receive the data packet from the first terminal, and obtain the first data from the data packet, to complete uplink user cooperation transmission.

Optionally, the method shown in FIG. 12 further includes: The network device sends the first identifier to the first terminal device and the second terminal device. The second terminal device may scramble the first data based on the first identifier, and send the scrambled first data to the second terminal device. The first terminal device may descramble, based on the first identifier, the data packet received from the second terminal device, and obtain the first data from the data packet.

Optionally, the network device may further send a second identifier to the first terminal device and the second terminal device. The second terminal device may scramble the first data based on the first identifier and the second identifier, and send the scrambled data to the first terminal device. Alternatively, the first terminal device may descramble, based on the first identifier and the second identifier, the data packet received from the second terminal device, obtain the first data from the data packet, and forward the first data to the network device.

Specifically, the second terminal device may determine an initial sequence of the scrambling code sequence, that is, a binary sequence of an initial value $c_{init}$ of the scrambling code sequence, based on the binary sequence of the first identifier and a binary sequence of the second identifier, and the network device may further determine, based on the initial sequence, the scrambling code sequence used to finally scramble to-be-sent data (for example, the first data). The initial sequence is a binary sequence with a length of 31 bits.

Alternatively, the second terminal device may determine an initial value $c_{init}$ of the scrambling code sequence based on the first identifier and the second identifier, convert the initial value $c_{init}$ of the scrambling code sequence into a binary sequence to obtain the initial sequence, determine the scrambling code sequence based on the initial sequence, and scramble the first data by using the scrambling code sequence.

In addition, the second terminal device selects different first identifiers, and accordingly, initial sequences determined based on the first identifiers and the second identifier are also different. For example, in correspondence to the two implementations of the first identifier, the second terminal device may determine the following two different initial sequences based on the first identifier and the second identifier.

Figure 15:
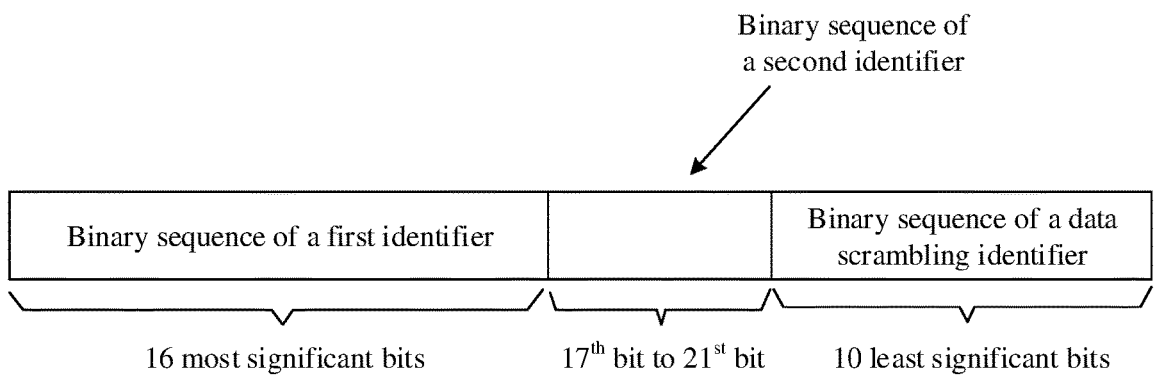

In a first case, corresponding to the implementation 1 of the first identifier, in an uplink user cooperation transmission scenario, the network device may determine the initial sequence shown in FIG. 15 based on the binary sequence of the first identifier and the binary sequence of the second identifier. Refer to FIG. 15. 16 most significant bits of the initial sequence are the binary sequence of the first identifier, and 10 least significant bits of the initial sequence are a binary sequence of a data scrambling identifier. At least one of the $17^{th}$ bit to the $21^{st}$ bit of the initial scrambling code sequence is the binary sequence of the second identifier.

In addition, for related explanations of the data scrambling identifier $n_{ID}$, refer to the foregoing descriptions. Details are not described herein again.

In this implementation, the initial value $c_{init}$ of the scrambling code sequence satisfies the following formula (7):

$$c_{init}=n_1 g 2^{15}+n_2 g 2^t+n_{ID} \qquad (7)$$

$n_1$ is the first identifier, and $n_2$ is the second identifier. Optionally, the network device may substitute the first identifier $n_1$, the second identifier $n_2$, and the data scrambling identifier $n_{ID}$ into the foregoing formula (7) to determine the initial value $c_{init}$ of the scrambling code sequence, convert the initial value $c_{init}$ of the scrambling code sequence into a binary sequence to obtain the initial sequence shown in FIG. 15, and then determine the scrambling code sequence based on the initial sequence.

It should be noted that a length of the second identifier $n_2$ is s bits, and s is an integer that is greater than or equal to 1 and is less than or equal to 5. In addition, a relationship between a value of s and a value of t satisfies the following Table 4.

TABLE 4

| Value of s | Value of t |
|---|---|
| 1 | 10, 11, 12, 13, or 14 |
| 2 | 10, 11, 12, or 13 |
| 3 | 10, 11, or 12 |
| 4 | 10 or 11 |
| 5 | 10 |

Correspondingly, the first terminal device may determine the initial sequence shown in FIG. 15 based on the binary sequence of the first identifier and the binary sequence of the second identifier. Alternatively, the first terminal device may substitute the first identifier, the second identifier, the transport block quantity identifier q, and the data scrambling identifier $n_{ID}$ into the foregoing formula (6) to determine the initial value $c_{init}$ of the scrambling code sequence, convert the initial value $c_{init}$ of the scrambling code sequence into a binary sequence to obtain the initial sequence shown in FIG. 15, and then determine the scrambling code sequence based on the initial sequence.

Figure 16:
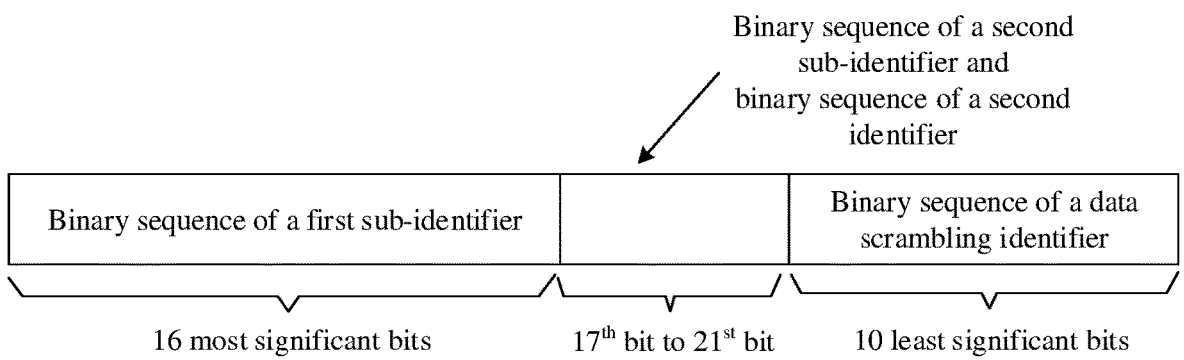

In a second case, corresponding to the implementation 2 of the first identifier, in an uplink user cooperation transmission scenario, the second terminal device may determine the initial sequence shown in FIG. 16 based on the binary sequence of the first identifier.

Refer to FIG. 16. 16 most significant bits of the initial sequence are a binary sequence of a first sub-identifier, a binary sequence of a second sub-identifier and the binary sequence of the second identifier jointly occupy the $17^{th}$ bit to the $21^{st}$ bit of the scrambling code sequence, and 10 least significant bits of the initial sequence are a binary sequence of a data scrambling identifier. In other words, the $17^{th}$ bit to the $21^{st}$ bit of the initial scrambling code sequence may be used to pad the binary sequence of the second sub-identifier and the binary sequence of the second identifier. It is assumed that a length of the binary sequence of the second sub-identifier is x, a length of the binary sequence of the second identifier is s, and (x+s) is an integer that is greater than or equal to 2 and is less than or equal to 5.

In addition, for related explanations of the data scrambling identifier $n_{ID}$, refer to the foregoing descriptions. Details are not described herein again.

In this implementation, the initial value $c_{init}$ of the scrambling code sequence satisfies the following formula (8):

$$c_{init}=n_{11} g 2^{15}+n_{12} g 2^y+n_2 g 2^t+n_{ID} \qquad (8)$$

$n_{11}$ is the first sub-identifier, $n_{12}$ is the second sub-identifier, and $n_2$ is the second identifier. Optionally, the network device may substitute the first sub-identifier $n_{11}$, the second sub-identifier $n_{12}$ the second identifier $n_2$, and the data scrambling identifier $n_{ID}$ into the foregoing formula (8) to determine the initial value $c_{init}$ of the scrambling code sequence, convert the initial value $c_{init}$ of the scrambling code sequence into a binary sequence to obtain the initial sequence shown in FIG. 11, and then determine the scrambling code sequence based on the initial sequence.

It should be noted that a length of the second identifier $n_2$ is s bits, a length of the second sub-identifier is x, and (x+s) is an integer that is greater than or equal to 2 and is less than or equal to 5. In addition, a relationship between a value of x and a value of y satisfies the foregoing Table 3, and a relationship between a value of s and a value of t satisfies the foregoing Table 4.

Correspondingly, the first terminal device may determine the initial sequence shown in FIG. 16 based on the binary sequence of the first sub-identifier, the binary sequence of the second sub-identifier, and the binary sequence of the second identifier. Alternatively, the first terminal device may substitute the first sub-identifier, the second sub-identifier, the second identifier, and the data scrambling identifier $n_{ID}$ into the foregoing formula (8) to determine the initial value $c_{init}$ of the scrambling code sequence, convert the initial value $c_{init}$ of the scrambling code sequence into a binary sequence to obtain the initial sequence shown in FIG. 16, and then determine the scrambling code sequence based on the initial sequence.

Optionally, the method shown in FIG. 7 further includes: The network device sends control information to the first terminal device, where the control information indicates the first terminal device to forward the first data to the network device. It may be understood that, in the uplink user cooperation transmission scenario, the network device may send downlink control information (DCI) to the first terminal device to indicate the first terminal device to cooperate with the second terminal device in sending data to the network device, that is, the first terminal device forwards the data to the network device after receiving the data from the network device.

For example, the network device may further explicitly indicate the first terminal device to perform cooperation transmission. For example, a i-bit indication field is added to the DCI. The indication field is padded with a "first value", indicating that the first terminal device cooperates with the second terminal device in sending the data to the network device, and the first data is terminated on the network device. The indication field is padded with a "second value", indicating that the first terminal device does not need to cooperate with the second terminal device in sending the data to the network device, and the first data is terminated on the first terminal device. Optionally, the first value is "1", and the second value is "0".

For example, the network device may further implicitly indicate the first terminal device to perform cooperation transmission. For example, the network device scrambles the DCI by using the first identifier, and the first terminal device descrambles a downlink control channel (physical downlink control channel, PDCCH) by using the first identifier. Successful descrambling of the PDCCH indicates that the first terminal device needs to perform cooperation transmission. Conversely, if the first terminal device fails to descramble the PDCCH by using the first identifier, the first terminal device does not need to cooperate with the second terminal device in sending the data to the network device.

Optionally, the first identifier may be further used to identify the second terminal device, and is different from a C-RNTI of the second terminal device. The network device may configure an identifier (for example, the first identifier) of the second terminal device for the first terminal device. The second terminal device may scramble the first data based on the identifier of the second terminal device. The first terminal device may descramble, based on the identifier of the second terminal device, the data packet received from the second terminal device, and obtain the first data from the data packet. Therefore, the first terminal device sends the first data to the network device, to complete cooperation transmission.

In this embodiment of this application, the terminal device is located in a weak-coverage area of a cell, for example, the second terminal device described in this embodiment of this application. When the second terminal device needs to transmit the data to the network device, the second terminal device may scramble the data by using the identifier of the cooperation group to which the second terminal device belongs, and then send the data to CUE in the cooperation group, for example, the first terminal device. The first terminal device may descramble the received data based on the identifier of the cooperation group, so that the first terminal device may forward the data to the network device. It can be learned that, in the method provided in this embodiment of this application, on the premise that existing single-hop data transmission on a Uu link is not affected, data scrambling transmission during user cooperation transmission is implemented and data transmission security during user cooperation transmission is improved.

In a possible implementation, the network device configures one identifier for each user cooperation group (UC group) in a cell by using radio resource control (RRC) signaling, that is, the first identifier in this embodiment of this application. Different user cooperation groups have different identifiers, and different identifiers may be used to distinguish between different user cooperation groups in the cell. In addition, the first identifier is different from a C-RNTI of a terminal device.

Optionally, a reserved value for an RNTI value may be used as the first identifier. For example, reserved values for the RNTI value are FFF0 to FFFD, and FFF0 to FFFD may be used as values of the first identifier. To be specific, one cell has a maximum of 14 UC groups, and first identifiers of the 14 UC groups are respectively FFF0, FFF1, FFF2, FFF3, FFF4, FFF5, FFF6, FFF7, FFF8, FFF9, FFFA, FFFB, FFFC, and FFFD.

In this embodiment of this application, a scrambling code sequence is generated by using a group-level identifier, so that data transmission in a user cooperation group in the cell may be obtained by CUE in the group, and the CUE further cooperates with the network device or SUE in completing data transmission, to ensure privacy of data transmission in the user cooperation group.

In a possible implementation, the network device may configure one identifier for each user cooperation group (UC group) in a cell by using RRC signaling, that is, the first sub-identifier in this embodiment of this application. The network device may further configure one identifier for each terminal device in the cell, that is, the second sub-identifier in this embodiment of this application. Different user cooperation groups may have a same first sub-identifier, and different second sub-identifiers may be used to distinguish between different user cooperation groups in the cell. Different user cooperation groups may alternatively have different first sub-identifiers, and the first sub-identifier and the second sub-identifier are used to uniquely indicate one user cooperation group. For example, two different first sub-identifiers are configured in one cell, for example, a first sub-identifier A and a first sub-identifier B. The second sub-identifier is one bit, and one cell may support four UC groups.

For example, a UC group 1 is indicated by using the first sub-identifier A+"0"; a UC group 2 is indicated by using the first sub-identifier A+"1"; a UC group 3 is indicated by using the first sub-identifier B+"0"; a UC group 4 is indicated by using the second sub-identifier B+"1".

It should be noted that the reserved value for the RNTI value may be used as the first sub-identifier. For example, reserved values for the RNTI value are FFF0 to FFFD, and FFF0 to FFFD may be used as values of the first sub-identifier. Alternatively, one of possible values of the RNTI may be randomly selected as a value of the first sub-identifier. For example, one of omit to FFEF is selected as the value of the first sub-identifier.

In this embodiment of this application, a scrambling code sequence is generated by using a group-level (group-level) first sub-identifier and a terminal-level second sub-identifier, so that data transmission in a user cooperation group in the cell may be obtained by CUE in the group, and the CUE further cooperates with the network device or SUE in completing data transmission, to ensure privacy of data transmission in the user cooperation group.

In a possible implementation, the network configures a first sub-identifier and a second sub-identifier for each terminal device in each UC group in a cell by using RRC signaling. UC groups in one cell are distinguished between by using k first sub-identifier values and different second sub-identifiers.

k first sub-identifiers may be selected from omit to FFEF, or k first sub-identifiers may be selected from FFF0 to FFFD.

In a possible implementation, the network configures a first sub-identifier and a second sub-identifier for each terminal device in each UC group in a cell by using RRC signaling. One UC group corresponds to one first sub-identifier, and different UC groups correspond to different first sub-identifiers. In each UC group, one terminal device corresponds to one second sub-identifier, and different terminal devices correspond to different second sub-identifiers.

One first sub-identifier may be selected from reserved values FFF0 to FFFD for the RNTI, or may be selected from values 0001 to FFEF for the RNTI.

In a possible implementation, the network device configures a first sub-identifier, a second sub-identifier, and a second identifier for each terminal device in each UC group in a cell by using RRC signaling. All UC groups in the cell use a same first sub-identifier. Different UC groups correspond to different second sub-identifier values, and second sub-identifiers are used to distinguish between different UC groups in one cell. In each UC group, one terminal device corresponds to one second identifier, and different terminal devices correspond to different second identifiers. Second identifiers are used to distinguish between different terminal devices in one UC group. Actually, the second sub-identifiers and the second identifiers may be used to distinguish between all terminal devices in all UC groups in the cell.

One first sub-identifier may be selected from reserved values FFF0 to FFFD for the RNTI, or may be selected from values 0001 to FFEF for the RNTI.

In a possible implementation, the network device configures a first sub-identifier, a second sub-identifier, and a second identifier for each terminal device in each UC group in a cell by using RRC signaling. UC groups in the cell are distinguished between by using k first sub-identifiers and different second sub-identifiers. In each UC group, one terminal device corresponds to one second sub-identifier, and different terminal devices correspond to different second terminal values. Second sub-identifiers are used to distinguish between different terminal devices in one UC group. Actually, the first sub-identifiers, the second sub-identifiers, and the second identifiers are used to distinguish between all the terminal devices in all the UC groups in the cell.

k first sub-identifiers may be selected from reserved values FFF0 to FFFD for the RNTI, or k first sub-identifiers may be selected from values 0001 to FFEF for the RNTI.

In a possible implementation, the network device may configure one first identifier for each terminal device in each UC group in a cell by using RRC signaling. In one UC group, one terminal corresponds to one first identifier, and different UEs correspond to different first identifiers.

k first sub-identifiers may be selected from reserved values FFF0 to FFFD for the RNTI, or k first sub-identifiers may be selected from values 0001 to FFEF for the RNTI.

Figure 17:
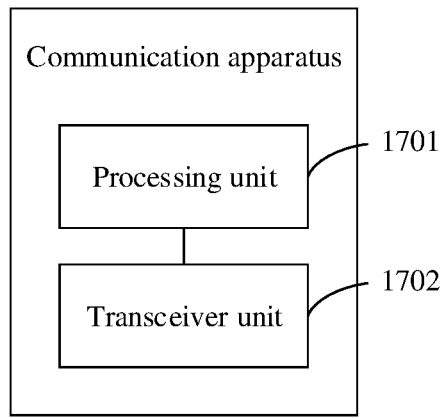
FIG. 17 is a block diagram of a structure of a communication apparatus according to an embodiment of this application.

When each functional module is obtained through division based on each corresponding function, FIG. 17 is a schematic diagram of a possible structure of the communication apparatus in the foregoing embodiments. The communication apparatus shown in FIG. 17 may be the first terminal device described in embodiments of this application, or may be a component that implements the foregoing methods in the first terminal device. As shown in FIG. 17, the communication apparatus includes a processing unit 1701 and a transceiver unit 1702. The processing unit may be one or more processors, and the transceiver unit may be a transceiver.

The processing unit 1701 is configured to support the first terminal device in performing step 703 and step 1203, and/or is configured to perform another process of the technology described in this specification.

The transceiver unit 1702 is configured to support the first terminal device in performing step 702, step 704, step 1702, and step 1704, and/or is configured to perform another process of the technology described in this specification.

It should be noted that, all related content of each step in the foregoing method embodiments may be cited in function descriptions of a corresponding functional module. Details are not described herein again.

In a possible implementation, the communication apparatus shown in FIG. 17 may alternatively be a chip applied to a terminal. The chip may be a system-on-a-chip (System-On-a-Chip, SOC), a baseband chip having a communication function, or the like.

The transceiver unit 1702 for receiving/sending may be an interface circuit of the apparatus, and is configured to receive a signal from another apparatus. For example, when the apparatus is implemented by using a chip, the transceiver unit 1702 is an interface circuit of the chip, and the interface circuit is configured to read or output a baseband signal.

Figure 18:
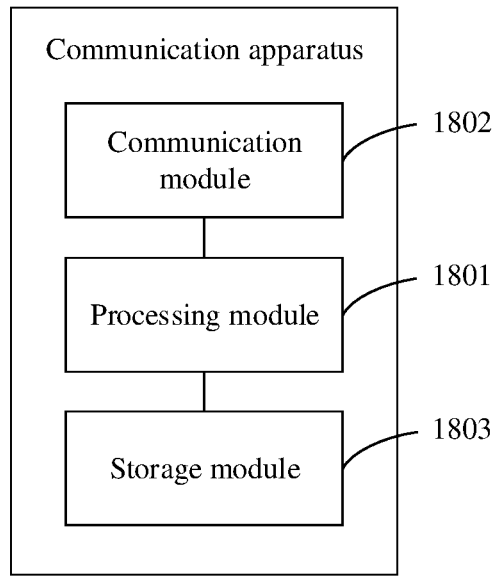
FIG. 18 is another block diagram of a structure of a communication apparatus according to an embodiment of this application.

For example, when an integrated unit is used, FIG. 18 is a schematic diagram of a structure of a communication apparatus according to an embodiment of this application. In FIG. 18, the communication apparatus includes a processing module 1801 and a communication module 1802. The processing module 1801 is configured to control and manage actions of the communication apparatus, for example, perform the step performed by the processing unit 1401, and/or is configured to perform another process of the technology described in this specification. The communication module 1802 is configured to perform the step performed by the transceiver unit 1402, and support interaction between the communication apparatus and another device, for example, interaction with another terminal apparatus. As shown in FIG. 18, the communication apparatus may further include a storage module 1803, and the storage module 1803 is configured to store program code and data of the communication apparatus.

When the processing module 1801 is a processor, the communication module 1802 is a transceiver, and the storage module 1803 is a memory, the communication apparatus is the communication apparatus shown in FIG. 6a.

Figure 19:
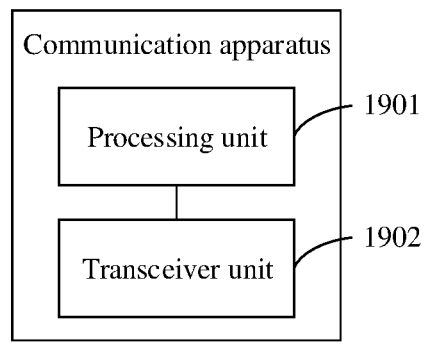
FIG. 19 is another block diagram of a structure of a communication apparatus according to an embodiment of this application.

When each functional module is obtained through division based on each corresponding function, FIG. 19 is a schematic diagram of a possible structure of the communication apparatus in the foregoing embodiments. The communication apparatus shown in FIG. 19 may be the network device described in embodiments of this application, or may be a component that implements the foregoing methods in the network device. As shown in FIG. 19, the communication apparatus includes a processing unit 1901 and a transceiver unit 1902. The processing unit may be one or more processors, and the transceiver unit may be a transceiver.

The processing unit 1901 is configured to support the network device in performing step 701, to generate first indication information, and/or is configured to perform another process of the technology described in this specification.

The transceiver unit 1902 is configured to support communication between the network device and another communication apparatus, for example, support the network device in performing step 1204 and step 702, and/or is configured to perform another process of the technology described in this specification.

It should be noted that, all related content of each step in the foregoing method embodiments may be cited in function descriptions of a corresponding functional module. Details are not described herein again.

In a possible implementation, the communication apparatus shown in FIG. 19 may alternatively be a chip applied to a network device. The chip may be a system-on-a-chip (SOC), a baseband chip having a communication function, or the like.

The transceiver unit 1902 for receiving/sending may be an interface circuit of the apparatus, and is configured to read a baseband signal. For example, when the apparatus is implemented by using a chip, the transceiver unit 1902 is an interface circuit used by the chip to read a baseband signal, or the transceiver unit 1902 is an interface circuit used by the chip to output a baseband signal.

Figure 20:
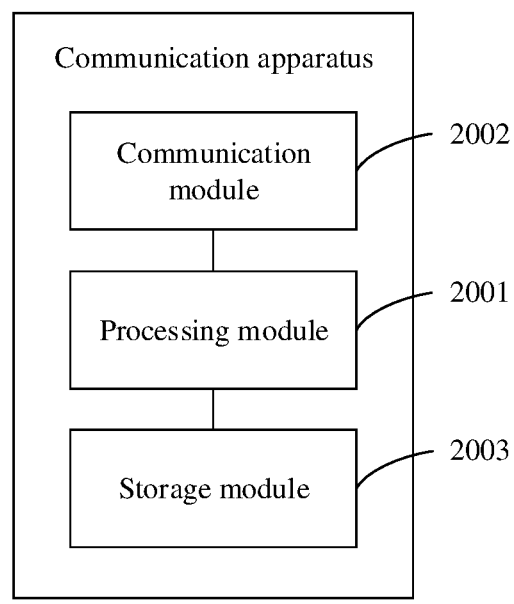
FIG. 20 is another block diagram of a structure of a communication apparatus according to an embodiment of this application.

For example, when an integrated unit is used, FIG. 20 is a schematic diagram of a structure of a communication apparatus according to an embodiment of this application. In FIG. 20, the communication apparatus includes a processing module 2001 and a communication module 2002. The processing module 2001 is configured to control and manage actions of the communication apparatus, for example, perform the step performed by the processing unit 1601, and/or is configured to perform another process of the technology described in this specification. The communication module 2002 is configured to perform the step performed by the transceiver unit 1602, and support interaction between the communication apparatus and another device, for example, interaction with another terminal apparatus. As shown in FIG. 20, the communication apparatus may further include a storage module 2003, and the storage module 2003 is configured to store program code and data of the communication apparatus.

When the processing module 2001 is a processor, the communication module 2002 is a transceiver, and the storage module 2003 is a memory, the communication apparatus is the communication apparatus shown in FIG. 6b.

An embodiment of this application provides a computer-readable storage medium. The computer-readable storage medium stores instructions. The instruction is used to perform the method shown in FIG. 7 or FIG. 12.

An embodiment of this application provides a computer program product including instructions. When the computer program product runs on a communication apparatus, the communication apparatus is enabled to perform the method shown in FIG. 7 or FIG. 12.

An embodiment of this application provides a wireless communication apparatus. The wireless communication apparatus stores instructions. When the wireless communication apparatus runs on the communication apparatuses shown in FIG. 6a, FIG. 6b, and FIG. 17 to FIG. 20, the communication apparatuses are enabled to perform the method shown in FIG. 7 or FIG. 12. The wireless communication apparatus may be a chip, or the like.

According to the foregoing descriptions of the implementations, a person skilled in the art may clearly understand that, for the purpose of convenient and brief description, only division into the foregoing functional modules is used as an example for description. In actual application, the foregoing functions may be allocated to different functional modules and implemented based on a requirement. To be specific, an inner structure of a database access apparatus is divided into different functional modules to implement all or some of the functions described above.

In the several embodiments provided in this application, it should be understood that the disclosed database access apparatus and method may be implemented in other manners. For example, the described database access apparatus embodiment is merely an example. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electrical, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes various media that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   obtaining, by a first terminal device, first data comprising scrambled data from a network device based on a first identifier, wherein the first identifier identifies a first cooperation group, and the first cooperation group comprises the first terminal device and a second terminal device; and
   forwarding, by the first terminal device, the first data to the second terminal device;
   wherein an initial sequence corresponding to a scrambling code sequence is a 31-bit binary sequence, 16 most significant bits of the initial sequence are a binary sequence of the first identifier, a $17^{th}$ bit of the initial sequence is a binary sequence of a transport block quantity identifier, and 10 least significant bits of the initial sequence are a binary sequence of a data scrambling identifier, and wherein the transport block quantity identifier indicates a quantity of transport blocks comprised in the first data.

2. The method according to claim 1, further comprising:
   receiving, by the first terminal device, the first identifier from the network device.

3. The method according to claim 1, wherein obtaining, by the first terminal device, the first data comprising scrambled data from a network device based on a first identifier comprises:
   receiving a data packet from the network device, and descrambling the data packet based on the scrambling code sequence that is determined using the first identifier, to obtain the first data.

4. The method according to claim 3, wherein the first identifier is a radio network temporary identifier (RNTI), and the first identifier is different from an RNTI of the first terminal device and different than an RNTI of the second terminal device.

5. The method according to claim 3, wherein the transport block quantity identifier indicates a quantity of transport blocks comprised in the first data, and the data scrambling identifier is configured by the network device, or the data scrambling identifier is a physical layer cell identifier.

6. A method, comprising:
scrambling, by a network device, first data using a first identifier, to obtain scrambled first data, wherein the first identifier identifies a first cooperation group, the first cooperation group comprises a first terminal device and a second terminal device, and the first data is data that is to be sent by the network device to the first terminal device; and
sending, by the network device, the scrambled first data to the second terminal device;
wherein scrambling, by the network device, the first data using the first identifier comprises determining a scrambling code sequence based on the first identifier, and scrambling the first data using the scrambling code sequence, wherein an initial sequence corresponding to the scrambling code sequence is a 31-bit binary sequence, 16 most significant bits of the initial sequence are a binary sequence of the first identifier, a $17^{th}$ bit of the initial sequence is a binary sequence of a transport block quantity identifier, and 10 least significant bits of the initial sequence are a binary sequence of a data scrambling identifier.

7. The method according to claim 6, further comprising:
sending, by the network device, the first identifier to the first terminal device and the second terminal device.

8. The method according to claim 6, wherein the first identifier is a radio network temporary identifier (RNTI), and the first identifier is different from an RNTI of the first terminal device and different from an RNTI of the second terminal device.

9. The method according to claim 6, wherein the transport block quantity identifier indicates a quantity of transport blocks comprised in the first data; and
wherein the data scrambling identifier is configured by the network device, or the data scrambling identifier is a physical layer cell identifier.

10. The method according to claim 6, wherein scrambling, by the network device, first data using the first identifier comprises:
determining a scrambling code sequence based on the first identifier and a second identifier, and scrambling the first data using the scrambling code sequence, wherein the second identifier identifies the second terminal device; and
wherein:
an initial sequence corresponding to the scrambling code sequence is a 31-bit binary sequence, 16 most significant bits of the initial sequence are a binary sequence of the first identifier, a $17^{th}$ bit of the initial sequence is a binary sequence of a transport block quantity identifier, 10 least significant bits of the initial sequence are a binary sequence of a data scrambling identifier, and at least one of a $18^{th}$ bit to a $21^{st}$ bit of the initial sequence is a binary sequence of the second identifier, wherein the transport block quantity identifier indicates a quantity of transport blocks comprised in the first data; or
an initial sequence corresponding to the scrambling code sequence is a 31-bit binary sequence, 16 most significant bits of the initial sequence are a binary sequence of the first identifier, 10 least significant bits of the initial sequence are a binary sequence of a data scrambling identifier, and at least one of a $17^{th}$ bit to a $21^{st}$ bit of the initial sequence is a binary sequence of the second identifier, wherein the data scrambling identifier is configured by the network device, or the data scrambling identifier is a physical layer cell identifier.

11. A communication apparatus, comprising:
one or more processors; and
a memory configured to store program instructions;
wherein, when executed by the one or more processors, the instructions cause the communications apparatus to:
obtain first data comprising scrambled data from a network device based on a first identifier, wherein the first identifier identifies a first cooperation group, and the first cooperation group comprises the communication apparatus and a second terminal device; and
forward the first data to the second terminal device;
wherein an initial sequence corresponding to a scrambling code sequence is a 31-bit binary sequence, 16 most significant bits of the initial sequence are a binary sequence of the first identifier, a $17^{th}$ bit of the initial sequence is a binary sequence of a transport block quantity identifier, and 10 least significant bits of the initial sequence are a binary sequence of a data scrambling identifier.

12. The communication apparatus according to claim 11, wherein when executed by the one or more processors, the instructions further cause the communications apparatus to receive the first identifier from the network device.

13. The communication apparatus according to claim 11, wherein when executed by the one or more processors, the instructions further cause the communications apparatus to:
receive a data packet from the network device; and
descramble, based on the scrambling code sequence that is determined using the first identifier, the data packet to obtain the first data.

14. The communication apparatus according to claim 13, wherein the first identifier is a radio network temporary identifier (RNTI), and the first identifier is different from an RNTI of the communication apparatus and different from an RNTI of the second terminal device.

15. The communication apparatus according to claim 13, the transport block quantity identifier indicates a quantity of transport blocks comprised in the first data; and
wherein the data scrambling identifier is configured by the network device, or the data scrambling identifier is a physical layer cell identifier.

16. A communication apparatus, comprising:
one or more processors, and
a memory configure to store program instructions;
wherein, when executed by the one or more processors, the instructions cause the communications apparatus to:
scramble first data using a first identifier, wherein the first identifier identifies a first cooperation group, the first cooperation group comprises a first terminal device and a second terminal device, and the first data is data that is to be sent by the communication apparatus to the first terminal device;
determine a scrambling code sequence based on the first identifier, and scramble the first data using the scrambling code sequence, wherein an initial sequence corresponding to the scrambling code sequence is a 31-bit binary sequence, 16 most significant bits of the initial sequence are a binary sequence of the first identifier, a $17^{th}$ bit of the initial sequence is a binary sequence of a transport block quantity identifier, and 10 least significant bits of the initial sequence are a binary sequence of a data scrambling identifier; and send the scrambled first data to the second terminal device.

17. The communication apparatus according to claim 16, wherein when executed by the one or more processors, the instructions further cause the communications apparatus to:
send the first identifier to the first terminal device and the second terminal device.

18. The communication apparatus according to claim 17, wherein the first identifier is a radio network temporary identifier (RNTI), and the first identifier is different from an RNTI of the first terminal device and different from an RNTI of the second terminal device.

19. The communication apparatus according to claim 17, wherein the transport block quantity identifier indicates a quantity of transport blocks comprised in the first data; and
wherein the data scrambling identifier is configured by the communications apparatus, or the data scrambling identifier is a physical layer cell identifier.

20. The communication apparatus according to claim 16, wherein when executed by the one or more processors, the instructions further cause the communications apparatus to:
determine a scrambling code sequence based on the first identifier and a second identifier, and scramble the first data using the scrambling code sequence, wherein the second identifier identifies the second terminal device; and wherein:
an initial sequence corresponding to the scrambling code sequence is a 31-bit binary sequence, 16 most significant bits of the initial sequence are a binary sequence of the first identifier, a $17^{th}$ bit of the initial sequence is a binary sequence of a transport block quantity identifier, 10 least significant bits of the initial sequence are a binary sequence of a data scrambling identifier, and at least one of a $18^{th}$ bit to a $21^{st}$ bit of the initial sequence is a binary sequence of the second identifier, wherein the transport block quantity identifier indicates a quantity of transport blocks comprised in the first data; or
an initial sequence corresponding to the scrambling code sequence is a 31-bit binary sequence, 16 most significant bits of the initial sequence are a binary sequence of the first identifier, 10 least significant bits of the initial sequence are a binary sequence of a data scrambling identifier, and at least one of a $17^{th}$ bit to a $21^{st}$ bit of the initial sequence is a binary sequence of the second identifier, wherein the data scrambling identifier is configured by the communications apparatus, or the data scrambling identifier is a physical layer cell identifier.

\* \* \* \* \*